(12) United States Patent
Zhang

(10) Patent No.: US 11,146,747 B1
(45) Date of Patent: Oct. 12, 2021

(54) DYNAMIC DRIVER MECHANISM FOR ROLLING SHUTTER SENSOR TO ACQUIRE THE STRUCTURED LIGHT PATTERN

(71) Applicant: Ambarella International LP, Santa Clara, CA (US)

(72) Inventor: Zhe Zhang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/068,200

(22) Filed: Oct. 12, 2020

(30) Foreign Application Priority Data

Sep. 30, 2020 (CN) .......................... 202011059177.0

(51) Int. Cl.
*H04N 5/353* (2011.01)
*H04N 13/254* (2018.01)
*G06K 9/00* (2006.01)
*H04N 13/296* (2018.01)

(52) U.S. Cl.
CPC ....... *H04N 5/3532* (2013.01); *G06K 9/00255* (2013.01); *H04N 13/254* (2018.05); *H04N 13/296* (2018.05); *G06K 9/00906* (2013.01)

(58) Field of Classification Search
CPC .. H04N 5/3532; H04N 13/254; H04N 13/296; G06K 9/00255; G06K 9/00906

USPC .......................................................... 348/46
See application file for complete search history.

(56) References Cited

U.S. PATENT DOCUMENTS

2020/0195875 A1\* 6/2020 Berkovich ............. G06K 9/627
2020/0292306 A1\* 9/2020 Meynants ............ G02B 27/425

\* cited by examiner

*Primary Examiner* — Allen C Wong
(74) *Attorney, Agent, or Firm* — Christopher P. Maiorana, PC

(57) ABSTRACT

An apparatus including a rolling shutter image sensor, a structured light projector and a processor. The rolling shutter image sensor may be configured to capture images. The structured light projector may be configured to generate a structured light pattern. The processor may be configured to receive the images from said rolling shutter image sensor, perform computer vision operations on the images to detect an object in the images, determine a start line location and an end line location corresponding to the object detected and present a control signal to the structured light projector. The control signal may be configured to activate the structured light pattern when the rolling shutter image sensor is at the start line location and deactivate the structured light pattern when the rolling shutter image sensor is at the end line location.

20 Claims, 13 Drawing Sheets

DYNAMIC DRIVER MECHANISM FOR ROLLING SHUTTER SENSOR TO ACQUIRE THE STRUCTURED LIGHT PATTERN

This application relates to Chinese Application No. 202011059177.0, filed Sep. 30, 2020, which is hereby incorporated by reference in its entirety.

FIELD OF THE INVENTION

The invention relates to 3D sensing systems generally and, more particularly, to a method and/or apparatus for implementing a dynamic driver mechanism for rolling shutter sensor to acquire the structured light pattern.

BACKGROUND

Conventional 3D sensing solutions utilize a global shutter sensor to capture a structured light pattern. Global shutter sensors are high cost devices because all the pixels of a global shutter sensor start exposure at the same time. Using global shutter sensors prevents low-cost devices from being solutions in 3D sensing applications.

A rolling shutter sensor is usually not used for capture of a structured light pattern because a rolling shutter sensor is unable to expose all pixels of the sensor simultaneously. Rolling shutter sensors tend to be lower cost sensors compared to global shutter sensors. Rolling shutter sensors only expose a portion of the pixels of the sensor at a time (i.e., each row (or line) of pixels start exposure at different times generally from the top of the sensor to the bottom of the sensor over time). Acquiring the structured light pattern with a rolling shutter sensor at a specified frame will affect other frames acquired at a different time. If the structured light pattern cannot match the infrared (IR) frame simultaneously, the IR frame may only have half or less frame with the structured light pattern. Even when the structured light pattern is present, the pattern will not be clear enough because the projector only turns on for a very short time due to hardware limitations.

It would be desirable to implement a dynamic driver mechanism for rolling shutter sensor to acquire the structured light pattern.

SUMMARY

The invention concerns an apparatus including a rolling shutter image sensor, a structured light projector and a processor. The rolling shutter image sensor may be configured to capture images. The structured light projector may be configured to generate a structured light pattern. The processor may be configured to receive the images from said rolling shutter image sensor, perform computer vision operations on the images to detect an object in the images, determine a start line location and an end line location corresponding to the object detected and present a control signal to the structured light projector. The control signal may be configured to activate the structured light pattern when the rolling shutter image sensor is at the start line location and deactivate the structured light pattern when the rolling shutter image sensor is at the end line location.

BRIEF DESCRIPTION OF THE FIGS

Embodiments of the invention will be apparent from the following detailed description and the appended claims and drawings.

DETAILED DESCRIPTION OF THE EMBODIMENTS

Figure 1:
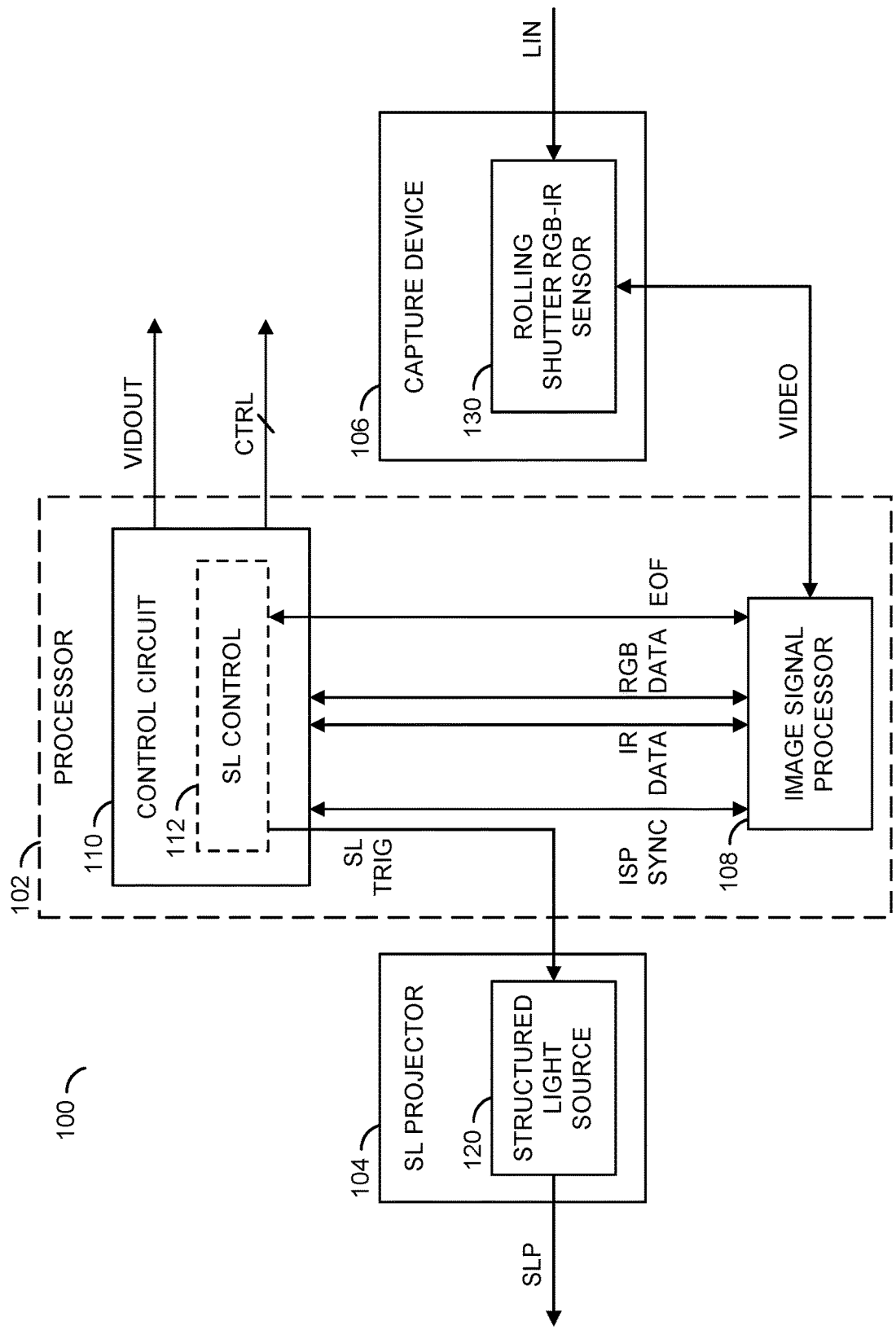
FIG. 1 is a diagram illustrating a rolling shutter sensor system in accordance with an example embodiment of the invention.

Embodiments of the present invention include providing a dynamic driver mechanism for rolling shutter sensor to acquire the structured light pattern that may (i) control a shutter exposure time of the rolling shutter sensor, (ii) control a turn on time and duration of a structured light projector, (iii) detect objects of interest to determine a region of interest, (iv) utilize a signal (or interrupt) from the rolling shutter sensor as a trigger signal, (v) generate a separate signal in response to the trigger signal to control the structured light projector, (vi) utilize a timer to control the on time of the structured light projector, (vii) align a timing of the structured light to a timing of exposure pixels of a rolling shutter sensor that correspond to a region of interest, (viii) have lower cost than a global shutter sensor implementation, (ix) provide greater flexibility for controlling structured light projector, (x) have reduced power consumption compared to a global shutter sensor implementation, (xi) be implemented in low-power and battery operated devices, (xii) be used to implement low cost structured light based 3D sensing systems, and/or (xiii) be implemented as one or more integrated circuits.

Embodiments of the present invention may implement a dynamic driver mechanism for a rolling shutter sensor. The dynamic driver mechanism may be configured to acquire a structured light pattern (SLP). A rolling shutter sensor may not be capable of exposing all pixels of the sensor simultaneously. The dynamic driver mechanism may be configured to enable the rolling shutter sensor to acquire the structured light pattern at a specific area. By enabling the rolling shutter sensor to acquire the structured light pattern at a specific area, the structured light pattern may be used to generate a depth image. For example, a depth image may be used for 3D sensing, 3D modeling, 3D face recognition, liveness judgment, etc.

In various embodiments, a low cost 3D sensing platform may be implemented comprising a vision system on chip (SoC), a structured light projector, and an RGB-IR rolling shutter image sensor. In various embodiments, a single RGB-IR image sensor may be utilized to obtain both a visible light image and an infrared (IR) image. In various embodiments, the visible light image (without the structured light pattern) and/or the infrared image (without the structured light pattern) may be utilized for viewing, object (e.g., face, etc.) detection, object identification, and/or facial recognition. The infrared (IR) image with the structured light pattern may be utilized for depth sensing and liveness determination. For example, an IR image may be generated without the structured light pattern (e.g., when a SLP projector is in an off state), and the IR image without the structured light pattern may also be used for face detection or face recognition. However, the IR image with the structured light pattern may be used for depth sensing/3D sensing/liveness determination, while the IR image without the structured light pattern may not be able to perform the depth sensing/3D sensing/liveness determination. In an example, the vision SoC may provide depth processing, anti-spoofing, structured light control, object detection, object identification and/or classification, 3D facial detection and/or recognition, and video encoding on a single chip. In an example, the vision SoC may generate one or more control signals in response to analyzing images captured by the RGB-IR rolling shutter image sensor. In an example, the vision SoC may control one or more features of a security system (e.g., a door lock, an alarm system, a controlled access system, a payment system, etc.) using the one or more control signals. In an example, the vision SoC may be configured to store and execute artificial neural networks (ANNs) implementing feature detection and extraction, object detection and identification, and facial detection and recognition. In an example, the ANNs may be stored (e.g., in a non-volatile computer readable storage medium) as directed acyclic graphs (DAGs) and corresponding weights.

Embodiments of the present invention may be configured to crop portions of an IR image and focus on a specified region of interest (ROI) to acquire the structured light pattern. The acquisition of the structured light pattern may be dynamic to ensure that the ROI may be full of the structured light pattern on the infrared (IR) image (e.g., the structured light pattern has sufficient integration time for the ROI). In an example, the ROI may be a location, region and/or portion of an image that comprises an object of interest (e.g., a human face). A depth image may be calculated from the IR image with the structured light pattern. Embodiments of the present invention may be configured to turn on the structured light from the start line of the ROI until the end line of the ROI. The ROI may be changed dynamically based on the position of the object of interest. If the activation timing of the structured light does not match the IR frame exposure timing at the specified line of the ROI simultaneously, then the ROI may not have the structured light with sufficient integration time. A fixed interrupt signal and a timer-based on the system clock may be implemented to control timing to prevent a mismatch between the IR frame exposure timing and the timing of the ROI acquisition of the rolling shutter sensor. Embodiments of the present invention may be configured to use a normal rolling shutter sensor (e.g., separate RGB and IR sensors) and/or an RGB-IR rolling shutter sensor (e.g., receive both RGB and IR pixel data with single sensor).

Embodiments of the present invention may be configured to implement a convolutional neural network (CNN). Computer vision operations may be performed to enable the CNN to detect the presence of an object of interest. The location (e.g., coordinates) of the object of interest may be detected in the image frame. For example, a human face may be detected using facial detection operations on the image frame. The location of the object of interest may be used to determine a start line and end line of the region of interest in the image frame. The structured light may be activated dynamically based on the start line and the end line of the region of interest (e.g., the face position determined in the image frame may be used to acquire the structured light pattern in the ROI)

Since rolling shutters may be less expensive than global shutter image sensors, implementing embodiments of the present invention may enable 3D sensing to be implemented in low-cost devices. The timing of the structured light projector may be controllable. The timing sequence may be adjusted easily for a flexible design (e.g., the timing may be corrected based on feedback). Controlling the timing of the activation of the structured light may provide power savings. The structured light pattern may be turned off when the object of interest is not present.

Embodiments of the present invention may be used in low-cost 3D sensing devices. The 3D sensing may be used in various applications to detect and/or recognize faces of people. In one example, a device may use facial recognition to unlock a door and/or disarm an alarm system. In another example, a device may use facial recognition to allow entry into particular areas (e.g., a 'tripwire' access to a restricted region). For example, a gardener/pool maintenance person may be recognized entering a backyard of a residential home and a home security alarm may not be triggered (e.g., possibly limited to certain times and days of the week). In yet another example, the facial recognition may be used to trigger alarm on recognition (e.g., if a restraining order is out against an ex-spouse, emergency services may be alerted if the ex-spouse is detected). In still another example, a secure system may be accessed by gaining privileges based on video/audio identification (e.g., akin to super-user access in Linux, where only a particular person or group may be permitted to change access level or policy, add users, etc. even if a correct password is entered). The types of devices that implement the present invention may be varied according to the design criteria of a particular implementation.

The low cost 3D sensing platform in accordance with embodiments of the present invention may be configured enable accurate biometric identification that also maintains user privacy. Accurate biometric identification may enable smart access control and video security products with facial biometrics and liveness detection for ethnically diverse populations. Biometric identification may enable contactless access (e.g., suitable for use during a pandemic). Sensing using 3D instead of 2D recognition may prevent spoofing, false positive, false negatives, gender bias, ethnic bias, etc.

For example, depth processing, anti-spoofing, 3D facial recognition, and video encoding may be implemented on a single processing chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advanced high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) models for advanced features such as people counting and anti-tailgating. Various embodiments of the present invention may implement a low-cost 3D sensing platform as described in co-pending U.S. patent application Ser. No. 16/996,114, filed on Aug. 18, 2020, appropriate portions of which are hereby incorporated by reference.

Referring to FIG. 1, a block diagram of an apparatus is shown illustrating an example implementation of a dynamic driver mechanism in accordance with an example embodiment of the invention. A system 100 is shown. The system 100 may implement a camera system and/or a 3D sensing platform. In one example, the system 100 may comprise a dynamic driver mechanism for an RGB-IR rolling shutter sensor configured to acquire a structured light pattern. In another example, the system 100 may comprise a dynamic driver mechanism for an IR rolling shutter sensor (e.g., an IR sensor implemented separately from an RGB image sensor).

The system 100 may comprise a block (or circuit) 102, a block (or circuit) 104 and/or a block (or circuit) 106. The circuit 102 may implement a processor and/or system on chip (SoC). The circuit 104 may implement an infrared structured light projector. The circuit 106 may implement a capture device (or module). In an example, the capture device 106 may be a security/surveillance camera. The system 100 may comprise other components (not shown). The number, type and/or arrangement of the components of the system 100 may be varied according to the design criteria of a particular implementation.

The processor 102 may comprise a block (or circuit) 108 and/or a block (or circuit) 110. The circuit 108 may implement an image signal processing (ISP) circuit (or processor or frontend). In an example, the circuit 108 is generally capable of performing multiple channel ISP. The circuit 110 may implement a control circuit (e.g., dedicated circuitry, embedded controller, processor, microprocessor, etc.). In an example, the circuit 102 may comprise a block (or circuit) 112. The circuit 112 may implement a structured light (SL) control circuit (or function). In one example, the circuit 110 and the circuit 112 may be implemented as separate circuit cores that may be instantiated on a single integrated circuit substrate (or die) or in a multi-chip module (MCM). The processor 102 may comprise other component (not shown). For example, the processor/SoC 102 may comprise a memory, an audio processor, and/or other hardware modules. The number, type and/or arrangement of the components of the processor 102 may be varied according to the design criteria of a particular implementation. The structured light projector 104 may comprise a structured light source 120. The structured light source 120 may be configured to generate a signal (e.g., SLP). The signal SLP may be a structured light pattern.

The capture device 106 may comprise a rolling shutter sensor 130. In the example shown, the rolling shutter sensor 130 may implement an RGB-IR sensor. In some embodiments, the capture device 106 may comprise a rolling shutter IR sensor and an RGB sensor (e.g., implemented as separate components). The capture device 106 may be configured to receive an input signal (e.g., LIN). The signal LIN may be a light input. The rolling shutter sensor 130 may be configured to convert the input light LIN into computer readable data.

In an example, the structured light source 120 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 120 may implement a near infrared (NIR) light source. In various embodiments, the light source of the structured light source 120 may be configured to emit light with a wavelength of approximately 940 nanometers (nm), which is not visible to the human eye. However, other wavelengths may be utilized. In an example, a wavelength in a range of approximately 800-1000 nm may be utilized.

In various embodiments, the circuit 110 may be connected to the IR structured light projector 104, the capture device 106, and the ISP circuit 108. The capture device 106 may also be connected to the ISP circuit 108. In an example, the circuit 110 generally provides a central control mechanism to synchronize timing of the structured light projector 104 and the capture device 106. In an example, the circuit 110 may be configured to calculate and maintain a predefined timing model to control the structured light source 120 of the structured light projector 104. In an example, the circuit 110 may be further configured to control an exposure time of the rolling shutter sensor 130 of the capture device 106. In an example, the circuit 110 may be further configured to control the ISP circuit 108 for synchronization with the output of the capture device 106.

In various embodiments, the circuit 110 may be configured to generate one or more video output signals (e.g., VIDOUT) and one or more control signals (e.g., CTRL). In an example, the one or more control signals CTRL may be used to control features (or operations) of one or more devices that are external to the circuit 110 and/or the SoC 102.

In some embodiments, the image signal processor 108 may be configured to present a signal (e.g., EOF). The signal EOF may be an interrupt signal. The interrupt signal EOF may provide an indication (or provide information facilitating calculation using a predefined formula) of when a first row (or line) of the rolling shutter sensor 130 begins exposure. The interrupt signal EOF may represent an end of frame indication generated by the rolling shutter sensor 130. The end of frame indication may correspond to an end of a previous frame. The end time of the previous frame may be used to calculate when the first line starts exposure of a current frame. The interrupt signal EOF may be a soft interrupt (e.g., not connected to a hardware pin). In one example, the image signal processor 108 (or IDSP) may be configured to generate the interrupt signal EOF. In another example, other sensor signals from the capture device 106 may be used to calculate when the first line starts exposure (e.g., using a predefined formula, etc.).

The interrupt signal EOF from the image signal processor 108 may be utilized by the circuit 112 to control the structured light projector 104. In another example, the interrupt signal EOF may be configured to generate an indication that the first row of the rolling sensor 130 may be beginning exposure. The interrupt may cause the circuit 112 to start a predefined turn-on period of the structured light source 120 of the structured light projector 104. In an example, the circuit 112 may be configured to program a timer with the predefined turn-on period. In response to receiving the interrupt signal EOF, the circuit 112 may start the timer to turn on the structured light source for the predefined period of time.

In the example shown, the circuit 110 may have an input that may receive the interrupt signal EOF. In the example, shown, the circuit 110 may have an input/output that may communicate via a signal (e.g., ISP SYNC) with an input/output of the ISP circuit 108. The signal ISP SYNC may be configured to synchronize the timing of the structured light projector 104 to the capture device 106.

In the example shown, the circuit 110 may have an input/output that may communicate a first image channel (e.g., RGB DATA) with an input/output of the ISP circuit 108 and another input/output that may communicate a second image channel (e.g., IR DATA) with another input/output of the ISP circuit 108.

In the example shown, the circuit 110 may have an output that may present a signal (e.g., SL TRIG) to an input of the structured light projector 104. The circuit 110 may further comprise an output to present the one or more video output signals VIDOUT and/or another output that may present the one or more control signals CTRL. The circuit 104 may be configured to generate a structured-light pattern in response to the signal SL TRIG.

In the example shown, the capture device 106 may receive the light input LIN. In the example shown, the capture device 106 may have an output that may present data that may communicate information that can be used to calculate the start time of the first line of exposure. For example, when the start time of first line exposure is known, the processor 102 may decide when to turn on the structured light source 120 at a specified time to make sure the ROI top to ROI bottom have the structured light pattern.

The capture device 106 may further comprise an input/output that may communicate a signal (e.g., VIDEO) to/from an input/output of the ISP circuit 108. In an example, the signal VIDEO may communicate four channels (e.g., R, G, B, and IR) of video pixel information to the ISP circuit 108. In an example, the capture device 106 and the ISP circuit 108 may also exchange control and/or status signals via the connection carrying the signal VIDEO (e.g., bi-directional communication). The capture device 106 may present the signal VIDEO to the image signal processor 108. The signal VIDEO may comprise image data from RGB and/or IR pixels. When the image signal processor 108 receives the signal VIDEO, the image signal processor 108 may analyze the frame timing and/or determine an end of frame and generate the interrupt signal EOF.

In an example, the ISP circuit 108 may be configured to split the four-channel RGB-IR video signal VIDEO into separate IR and RGB image data channels. In an example, the ISP circuit 108 may be configured to generate the first image channel RGB DATA and the second image channel IR DATA in response to the signal VIDEO. The first image channel RGB DATA generally comprises color image data.

In an example, the color image data may comprise RGB or YUV color space data. In an example, the second image channel IR DATA may comprise monochrome image data. When the structured light pattern is projected by the structured light projector circuit 104, the second image channel IR DATA generally comprises both IR image data and the structured light pattern projected by the structured light projector circuit 104. When the structured light pattern is not projected by the structured light projector circuit 104, the second image channel IR DATA generally comprises IR image data with no structured light pattern. When the structured light pattern is projected by the structured light projector circuit 104, the first image channel RGB DATA generally comprises the structured light pattern projected by the structured light projector circuit 104 also, and, therefore, is generally ignored.

In an example, the structured light pattern data carried by the second image channel IR DATA may be analyzed by the circuit 102 to obtain 3D (e.g., depth) information for the field of view of the capture device 106. The circuit 110 may be further configured to make a liveness determination based upon the structured light pattern data carried by the second image channel IR DATA. In an example, the RGB (or YUV) data along with the IR data without the structured light pattern may be analyzed by the circuit 110 to discern (e.g., detect, identify, etc.) one or more features or objects in the field of view of the capture device 106.

In an example, the circuit 112 may be configured to generate the signal SL TRIG. The circuit 112 may implement a structured light control timing protocol in accordance with embodiments of the invention (described below in connection with FIGS. 2-8). In an example, the circuit 112 may be implemented in hardware, software (or firmware, microcoding, etc.), or a combination of hardware and software.

In an example, the structured light source 120 may be configured to emit the structured light pattern in response to the signal SL TRIG. In an example, a period and/or intensity of the light emitted by the structured light source 120 may be controlled (e.g., programmed) by the circuit 110. In an example, the circuit 110 may configure the structured light source 120 prior to asserting the signal SL TRIG.

In an example, the rolling shutter sensor 130 may be implemented as a rolling shutter image sensor. In an example, the rolling shutter sensor 130 may be implemented as an RGB-IR rolling shutter complementary metal oxide semiconductor (CMOS) image sensor. In one example, the rolling shutter sensor 130 may be configured to assert a signal (e.g., FLES, not shown) that indicates a first line exposure time. In another example, the rolling shutter sensor 130 may be configured to provide the signal VIDEO and the image signal processor 108 may calculate the start of the exposure of the first line (or row) of the rolling shutter sensor 130 using a predefined formula (in response to the end of the previous frame being detected in order to indicate a first line (or row) of the rolling shutter sensor 130 starting exposure for the current image frame).

In one example, the rolling shutter sensor 130 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

Figure 2:
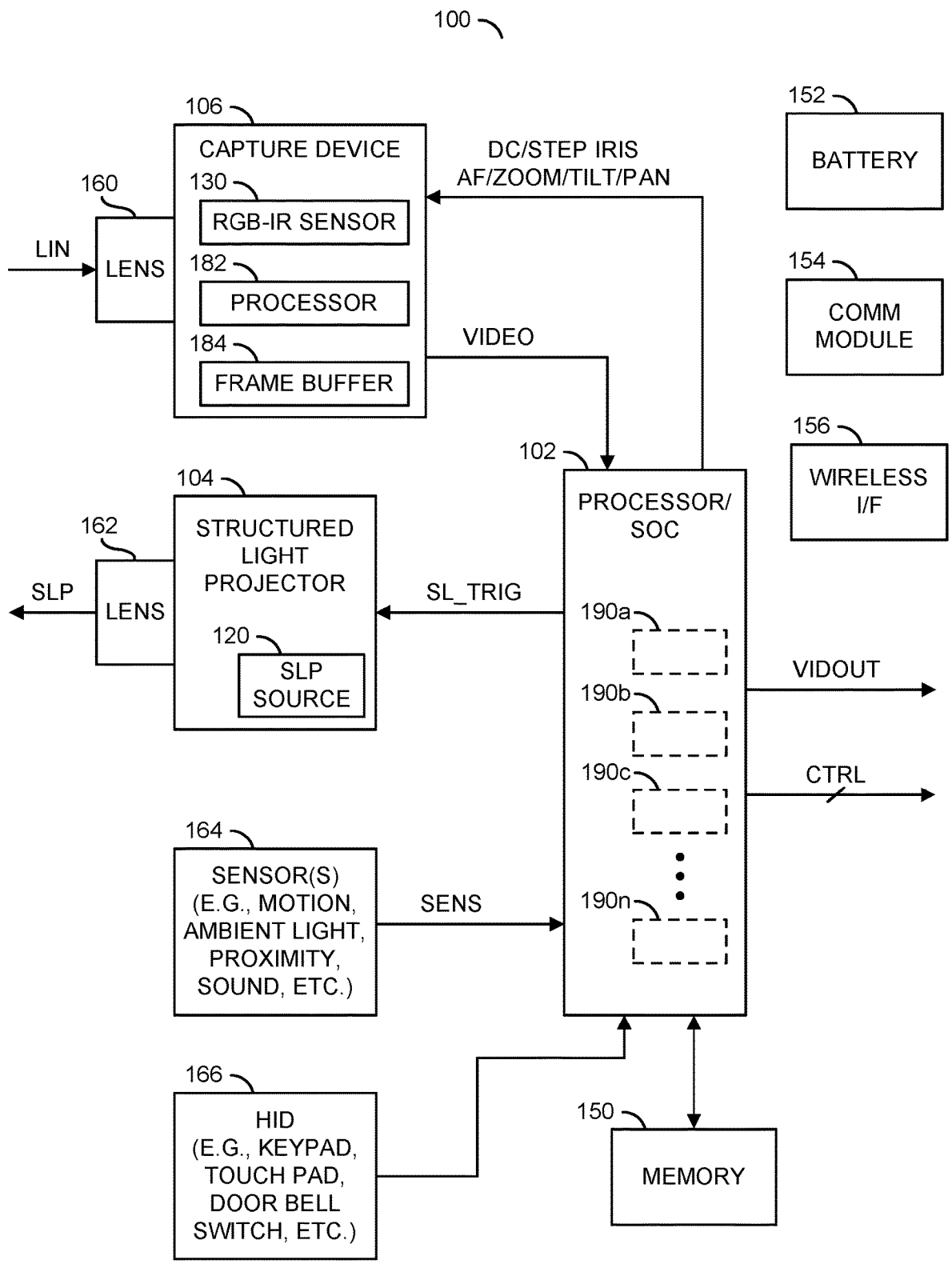
FIG. 2 is a diagram illustrating a block diagram of a camera system.

Referring to FIG. 2, a block diagram of the camera system 100 is shown illustrating an example implementation. In an example, the camera system 100 may comprise the processor/SoC 102, the structured light projector 104, the capture device 106, a block (or circuit) 150, a block (or circuit) 152, a block (or circuit) 154, a block (or circuit) 154, a block (or circuit) 160, a block (or circuit) 162, a block (or circuit) 164, and/or a block (or circuit) 166. The circuit 150 may implement a memory. The circuit 152 may implement a battery 152. The circuit 154 may implement a communication device. The circuit 156 may implement a wireless interface. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the IR structured light projector 104, the capture device 106, the memory 150, the lens 160, the IR structured light projector 104, the structured light pattern lens 162, the sensors 164, the battery 152, the communication module 154, and the wireless interface 156. In another example, the camera system 100 may comprise processor/SoC 102, the structured light projector 104, the capture device 106, the lens 160, the structured light pattern lens 162, and the sensors 164, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, and/or metadata information.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, etc.) stored in the memory 150. In an example, the memory 150 may store one or more directed acyclic graphs (DAGs) and one or more sets of weights defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for the rolling shutter sensor 130 may be configured to conserve power consumption. Reducing the power consumption may enable the camera system 100 to operate using the battery 152 for extended periods of time without recharging.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee. In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send the video data VIDOUT and/or the control signal(s) CTRL to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

The lens 160 may be attached to the capture device 106. In an example, the capture device 106 may comprise the image sensor 130, a block (or circuit) 182, and a block (or circuit) 184. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be wide-angle lenses and/or fish-eye lenses (e.g., lenses capable of capturing a wide field of view). The lens 160 may be configured to capture and/or focus the light for the capture device 106. Generally, the image sensor 130 is located behind the lens 160. Based on the captured light from the lens 160, the capture device 106 may generate a bitstream and/or video data (e.g., the signal VIDEO).

The capture device 106 may be configured to capture video image data (e.g., light collected and focused by the lens 160). The capture device 106 may capture data received through the lens 160 to generate a video bitstream (e.g., a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 106 may transform the received light into a digital data stream. In some embodiments, the capture device 106 may perform an analog to digital conversion. For example, the image sensor 130 may perform a photoelectric conversion of the light received by the lens 160. The processor/logic 182 may transform the digital data stream into a video data stream (or bitstream), a video file, and/or a number of video frames. In an example, the capture device 106 may present the video data as a digital video signal (e.g., VIDEO). The digital video signal may comprise the video frames (e.g., sequential digital images and/or audio).

The video data captured by the capture device 106 may be represented as a signal/bitstream/data VIDEO (e.g., a digital video signal). The capture device 106 may present the signal VIDEO to the processor/SoC 102. The signal VIDEO may represent the video frames/video data. The signal VIDEO may be a video stream captured by the capture device 106. In some embodiments, the signal VIDEO may comprise pixel data that may be operated on by the processor 102 (e.g., a video processing pipeline, the ISP 108, etc.). The processor 102 may generate the video frames in response to the pixel data in the signal VIDEO.

The image sensor 130 may receive the input light LIN from the lens 160 and transform the light LIN into digital data (e.g., the bitstream). For example, the image sensor 130 may perform a photoelectric conversion of the light from the lens 160. In some embodiments, the image sensor 130 may have extra margins that are not used as part of the image output. In some embodiments, the image sensor 130 may not have extra margins. In various embodiments, the image sensor 130 may be configured to generate an RGB-IR video signal. In an infrared light only illuminated field of view, the image sensor 130 may generate a monochrome (B/W) video signal. In a field of view illuminated by both IR light and visible light, the image sensor 130 may be configured to generate color information in addition to the monochrome video signal. In various embodiments, the image sensor 130 may be configured to generate a video signal in response to visible and/or infrared (IR) light.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 130 and generate (e.g., encode) video data (e.g., the bitstream) based on the raw data. The capture device 106 may have the memory 184 to store the raw data and/or the processed bitstream. For example, the capture device 106 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 106. The processor/logic 182 may provide status information about the captured video frames.

The structured light pattern lens 162 may be a lens for the structured light projector 104. The structured light pattern lens 162 may be configured to enable the structured light SLP generated by the structured light source 120 of the structured light projector 104 to be emitted while protecting the structured light source 120. The structured light pattern lens 162 may be configured to decompose the laser light pattern generated by the structured light source 120 into a pattern array (e.g., a dense dot pattern array).

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100. In various embodiments, the detection of motion may be used as one threshold for activating the capture device 106. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 106 may be turned on to provide images for identifying a person attempting access, and illumination of a lock area, and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT) and one or more control signals (e.g., CTRL) based on the signal VIDEO, the signal SENS, and/or other input. In some embodiments, the signals VIDOUT and CTRL may be generated based on analysis of the signal VIDEO and/or objects detected in the signal VIDEO. In various embodiments, the processor/SoC 102 may be configured to perform one or more of feature extraction, object detection, object tracking, and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data from the signal VIDEO. The video output signal VIDOUT may be presented to the memory 150, the communications module 154, and/or the wireless interface 156.

The multi-step approach to activating and/or disabling the capture device 106 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 106, the memory 150, the communications module 154, etc.) may be off. In another example, the camera system 100 may operate in an intermediate state. In the intermediate state, the image capture device 106 may be on and the memory 150 and/or the communications module 154 may be off. In yet another example, the camera system 100 may operate in a power-on (or high power) state. In the power-on state, the sensors 164, the processor/SoC 102, the capture device 106, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision (e.g., object detection, segmentation, classification, etc.), etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, U.S. patent application Ser. No. 16/991,344, filed on Aug. 12, 2020, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weightings to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels, the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 3:
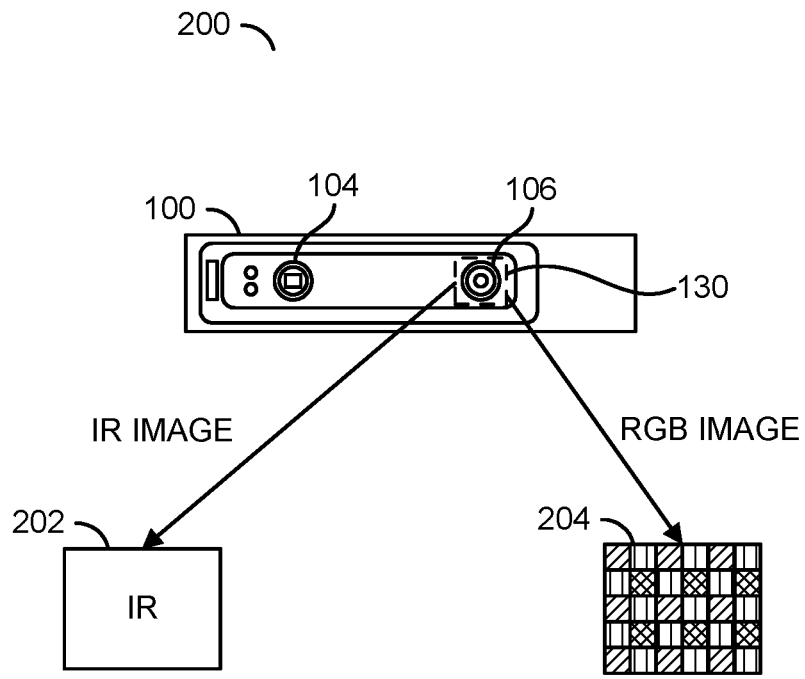
FIG. 3 is a diagram illustrating a rolling shutter system in a camera system comprising an RGB-IR rolling shutter sensor.

Referring to FIG. 3, a diagram illustrating a rolling shutter system in a camera system comprising an RGB-IR rolling shutter sensor is shown. An example embodiment 200 is shown. The example embodiment 200 may comprise an embodiment of the camera system 100. The camera system 100 may comprise the structured light projector 104 and/or the capture device 106.

The example embodiment 200 may be an example of the camera system 100 implementing an RGB-IR rolling shutter sensor. The RGB-IR rolling shutter sensor 130 is shown as a component of the capture device 106. In one example, the dynamic driver mechanism for a rolling shutter sensor implemented by the camera system 100 may be configured to operate with the RBG-IR rolling shutter sensor 130.

The camera system 100 is shown generating pixel data 202 and pixel data 204. The pixel data 202 may be pixel data that may be used to generate an IR image (or video frame). The pixel data 204 may be pixel data that may be used to generate an RGB image (or video frame). The video processing pipeline (e.g., the ISP circuit 108) of the processor 102 may be configured to generate the IR image in response to the IR pixel data 202 in the signal VIDEO generated by the RGB-IR rolling shutter sensor 130. The video processing pipeline of the processor 102 may be configured to generate the RGB image in response to the RGB pixel data 204 in response to the signal VIDEO generated by the RGB-IR rolling shutter sensor 130. In the example shown, the IR pixel data 202 and the RGB pixel data 204 are shown external to the camera system 100. However, generally, the IR pixel data 202 (and the IR image generated) and/or the RGB pixel data 204 (and the RGB image generated) may be used internally by the processor 102 (e.g., the signal IR DATA and the signal RBG DATA received by the control circuit 112).

Figure 4:
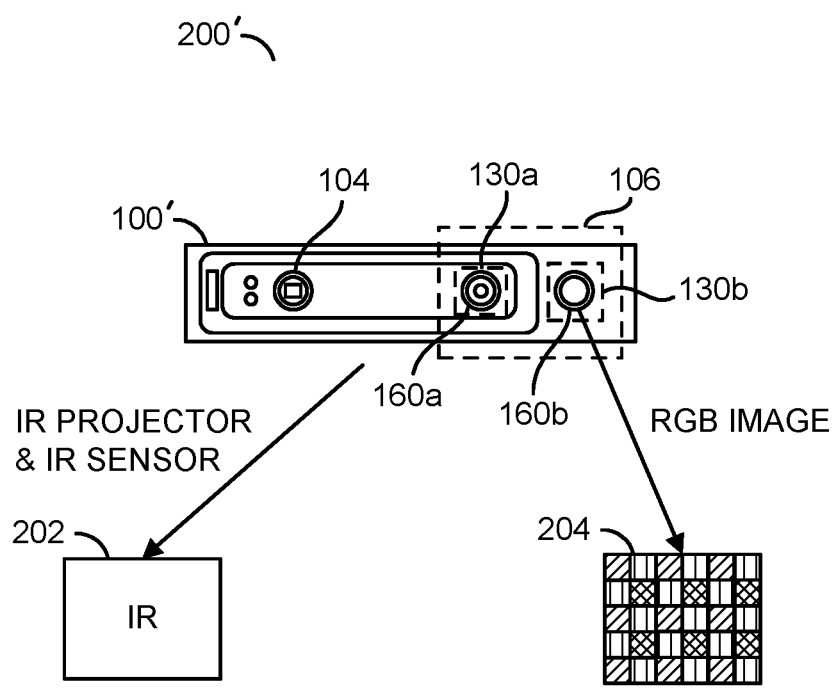
FIG. 4 is a diagram illustrating a rolling shutter system in a camera system comprising a separate IR rolling shutter sensor and RGB rolling shutter sensor.

Referring to FIG. 4, a diagram illustrating a rolling shutter system in a camera system comprising a separate IR rolling shutter sensor and RGB rolling shutter sensor is shown. An example embodiment 200' is shown. The example embodiment 200' may comprise an embodiment of the camera system 100'. The camera system 100' may comprise the structured light projector 104 and/or the capture device 106.

The example embodiment 200' may be an example of the camera system 100' implementing a separate IR rolling shutter sensor and RGB rolling shutter sensor. The capture device 106 is shown comprising the IR rolling shutter sensor 130a and the RGB rolling shutter sensor 130b. Lenses 160a-160b are shown. The lens 160a may be a lens for the IR rolling shutter sensor 130a and the lens 160b may be a lens for the RGB rolling shutter sensor 130b. In one example, the dynamic driver mechanism for a rolling shutter sensor implemented by the camera system 100' may be configured to operate with the IR rolling shutter sensor 130a and the RGB rolling shutter sensor 130b.

The camera system 100' is shown generating the IR pixel data 202 and the RGB pixel data 204. The IR image may be generated in response to IR pixel data 202 generated by the IR rolling shutter sensor 130a. The RGB image may be generated in response to the RGB pixel data 204 generated by the RGB rolling shutter sensor 130b. The video processing pipeline of the processor 102 may be configured to generate the IR image in response to the IR pixel data 202 generated by the IR rolling shutter sensor 130a. The video processing pipeline of the processor 102 may be configured to generate the RGB image in response to the RGB pixel data 204 generated by the RGB rolling shutter sensor 130b. In the example shown, the IR pixel data 202 and the RGB pixel data 204 are shown external to the camera system 100. However, generally, the IR pixel data 202 (and the RGB image) and/or the RGB pixel data 204 (and the RGB image)

may be used internally by the processor 102 (e.g., the signal IR DATA and the signal RBG DATA received by the control circuit 112).

Figure 5:
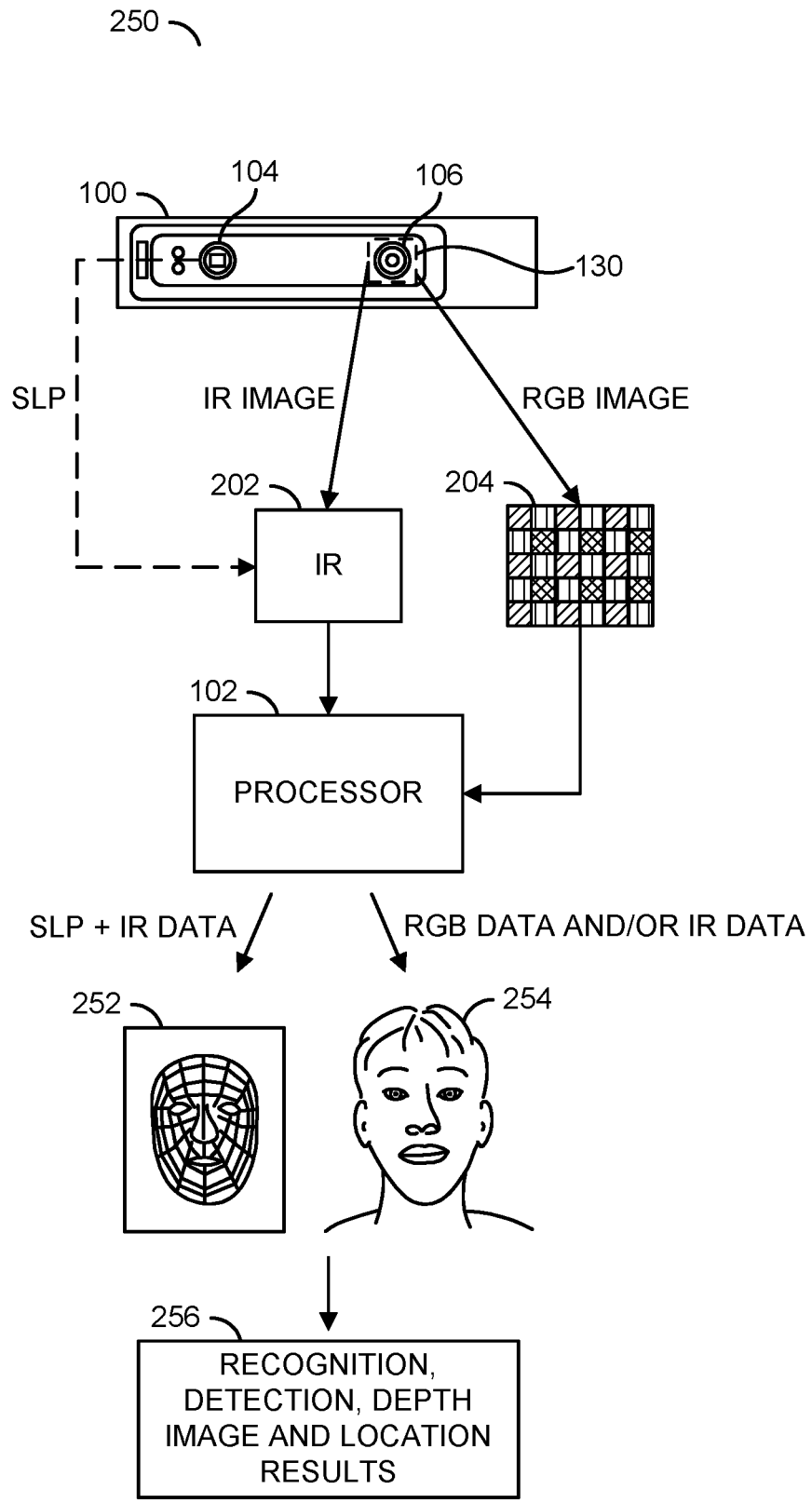
FIG. 5 is a diagram illustrating elements of a 3D sensing system in accordance with an example embodiment of the invention.

Referring to FIG. 5, a diagram illustrating elements of a 3D sensing system in accordance with an example embodiment of the invention is shown. A 3D sensing system 250 is shown. The 3D sensing system 250 may comprise the camera system 100. In the example shown, the 3D sensing system 250 may implement the RGB-IR camera system 100 shown in association with FIG. 3. In some embodiments, the 3D sensing system 250 may implement the camera system 100 having the IR sensor 130a separate from the RGB sensor 130b. The camera system 100 may be implemented within a housing (e.g., a sealed enclosure, a weatherproofed enclosure, a protective enclosure, etc.). For example, the infrared (IR) structured light projector 104, including the structured light pattern lens 162 and the structured light source 120, and the capture device 106, including the lens 160 and the single RGB-IR image sensor 130, may be mounted in the housing.

The IR structured light projector 104 may be configured, when turned on, to project the structured light pattern SLP on objects in the field of view of the capture device 106. The RGB-IR sensor 130 may be used to acquire both IR image data (with and without the structured light pattern SLP) and RGB image data for the objects in the field of view of the capture device 106. The 3D sensing system 200 generally provides advantages over conventional two camera sensing systems. For example, by utilizing only one RGB-IR rolling shutter sensor 130 to obtain both RGB and IR image data with/without the structured light pattern SLP, the 3D sensing system 200 generally reduces the system cost and the system complexity relative to conventional systems using global shutter sensors (e.g., one sensor and one lens versus two sensors and two lenses, and rolling shutter vs. global shutter).

The structured light pattern SLP is shown as a dotted line. The dotted line may represent that the structured light pattern SLP may not always be present (e.g., only present when the structured light projector 104 is activated). When the projector 104 is activated, the data corresponding to the structured light pattern SLP may be received by the processor 102 as part of the IR data 202. When the projector 104 is not activated, the processor 102 may not receive the data corresponding to the structured light pattern SLP. The IR pixel data 202 generated by the RGB-IR rolling shutter sensor 130 may be received by the processor 102. The RGB pixel data 204 generated by the RGB-IR rolling shutter data 130 may be received by the processor 102. For example, the processor 102 may receive the IR pixel data 202 and the RGB pixel data 204 without the structured light pattern SLP or receive the IR pixel data 202 and the RGB pixel data 204 with the structured light pattern SLP.

The video processing pipeline (e.g., the ISP circuit 108) of the processor 102 (e.g., implementing one or more of the hardware modules 190a-190n) may be configured to generate images and/or video frames in response to the IR pixel data 202, the RGB pixel data 204 and/or the structured light pattern SLP. In an example, the processor 102 may be configured to separate (split) the IR pixel data 202 and the RGB pixel data 204 from the RGB-IR sensor 130 into an IR image data channel (e.g., IR DATA) and an RGB image data channel (e.g., RGB DATA). The processor 102 may be configured to generate video frames from the IR pixel data 202 and/or the RGB pixel data 204.

In an example, the IR image data channel and/or the RGB image data channel may be processed by the processor 102 for 3D (e.g., depth) perception, liveness determination, object detection, face detection, object identification, and facial recognition. In an example, the IR image data channel with the structured light pattern SLP present may be used to perform depth analysis and liveness determination. The IR image data without the structured light pattern SLP present and the RGB image data channel may be used to perform object detection, face detection, object identification, and facial recognition.

In an example, a depth analysis 252 may be applied to the IR image data channel when the structured light pattern SLP is present (e.g., the structured light projector 104 is turned on in response to the signal SL TRIG). The depth analysis 252 may be utilized also to make liveness determinations. In an example, the depth analysis 252 may be utilized to discern between an image frame that comprises a real person and an image frame that comprises a representation of a person (e.g., a photograph, an image displayed on a computer, an image displayed on a smartphone, etc.). In an example, both the IR image data channel when the structured light pattern SLP is not present (e.g., the structured light projector 104 is turned off) and the RGB image data channel may be used to perform object detection, face detection, object identification, facial recognition, etc.

In an example, the IR image data channel when the structured light pattern SLP is not present (e.g., the structured light projector 104 is turned off) and/or the RGB image data channel may be presented as inputs to hardware modules 190a-190n. In an example, one or more of the hardware modules 190a-190n may be configured to implement one or more neural network architectures including, but not limited to, a convolutional neural network (CNN), a deep-learning neural network (DNN), a fully connected neural network, etc. Neural networks, more properly referred to as "artificial" neural networks (ANNs), are computing systems made up of a number of simple, highly interconnected processing elements (e.g., implemented by one or more of the hardware modules 190a-190n), which process information by respective dynamic state responses to external inputs. Neural networks are processing devices (algorithms or actual hardware) that are loosely modeled after the neuronal structure of a brain, but on much smaller scales. A large neural network may have hundreds or thousands of processing units.

Neural networks are typically organized in layers. The layers may comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented.

In an example, the CNN module 190b may be configured (e.g., by design, through a training process, etc.) to obtain detection, recognition, and/or classification results in real time. The CNN module 190b may be configured to perform various computer vision operations 254. In an example, in a low light (or night) environment the computer vision operations 254 may utilize the IR image data channel to identify features of the person in a generated image and/or identify the inanimate object (e.g., a computer, a vehicle, a tree, etc.) in the image. In brighter (daytime) environments, the computer vision operations 254 may utilize the RGB image data channel to render inferences based upon a color image (e.g., to detect a person and/or an inanimate object, etc.).

The depth analysis 252 and/or the computer vision operations 254 may be configured to generate results 256. The processor 102 may be configured to utilize, alone or in combination, results of the depth analysis 252 and the computer vision operations 254. The results 256 may comprise data corresponding to recognition, detection and/or locations of objects in the video frames. In an example, the results 256 may comprise a depth image.

The IR Data with the structured light pattern SLP may be used to perform the depth analysis 252 and then the results 256 of the depth analysis 252 may be used for liveness determination. The RGB data 204 and/or the IR data 202 without the structured light pattern SLP may be used to perform computer vision operations 254 (e.g., for face detection, object detection, etc.). A combination of the depth analysis 252 and the computer vision operations 254 may generate the results 256, which may comprise the liveness result and facial recognition result. The result of face detection may be the coordinate(s) of the face. The coordinates of the face may be used for crop data from the original image for face recognition. The coordinates of the face may also be used for controlling the activation (e.g., turning on the structured light projector 104 dynamically) and then the IR data 202 received with SLP will be used to perform the depth analysis 252 on the face ROI.

For example, the processor 102 may use the results 256 to determine the location of an object of interest in the video frame (e.g., an X,Y coordinate in pixels of the video frame, a location of a bounding box corresponding to the object of interest in the video frame, etc.). The results 256 may comprise information about the classification of objects detected (e.g., the type of object detected, whether the detected object matches a reference object, etc.). The results 256 may be used by the processor 102 to perform facial detection and/or recognition (e.g., to identify a detected person as a specific person). The utilization of the results 256 by the processor 102 may be varied according to the design criteria of a particular implementation.

Figure 6:
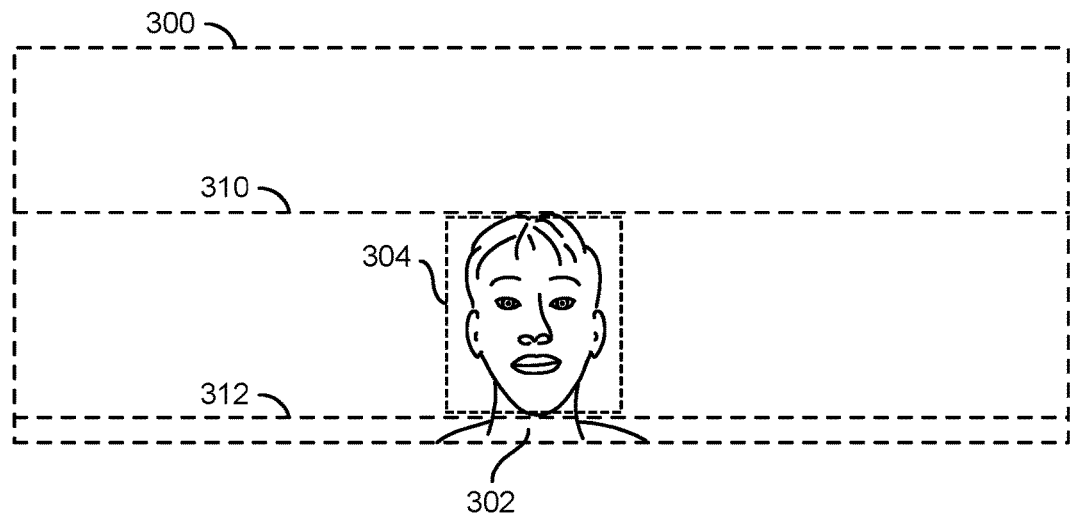
FIG. 6 is a diagram illustrating detecting a start line and an end line of a region of interest in an image frame.

Referring to FIG. 6, a diagram illustrating detecting a start line and an end line of a region of interest in an image frame is shown. An image frame (or video frame) 300 is shown. The image frame 300 may be a representative example of a video frame generated by the processor 102. In an example, the video frame 300 may be used internally by the processor 102 for the computer vision operations 254. In another example, the video frame 300 may be presented as an output of the camera system 100 (e.g., as the signal VIDOUT). For example, the video frame 300 may be presented to a display system.

In the example shown, the video frame 300 may represent a video frame generated in response to the IR image data (e.g., from the IR pixel data 202) and the RGB image data channel (e.g., from the RGB pixel data 204) without the structured light pattern output SLP present. For example, the processor 102 may use the video frame 300 to perform object detection, face detection and/or determine a location of an object in the video frame 300. The example video frame 300 may comprise an image of a person 302. The person 302 is shown in a portion of the video frame 300 (e.g., the video data corresponding to the person 302 does not take up the entire video frame). The person 302 may be the object of interest. Generally, video frames may comprise video data corresponding to other objects and/or scenery (e.g., background, trees, the ground, the sky, distant objects, etc.). For illustrative purposes, the example video frame 300 may show only the person 302.

A dotted box 304 is shown. The dotted box 304 may correspond to the face of the person 302. For example, the face of the person 302 may be the object of interest. For example, the video frame 300 may be an example of the camera system 100 being used in a facial recognition application. The dotted box 304 may represent a bounding box of a detected object. The bounding box 304 may be shown for illustrative purposes. Generally, the bounding box 304 may not shown in the output video signal VIDOUT when output to a display (e.g., the bounding box 304 may be shown in a debug mode of operation to indicate which objects are detected in a video frame and/or to ensure that facial recognition is being performed). The bounding box 304 may represent a location in the video frame 300 (e.g., coordinate values) that the object of interest has been detected.

The object of interest may be detected by the processor 102. The particular object of interest detected may be determined in response to computer readable instructions and/or reference objects stored by the memory 150. The processor 102 may be configured to detect various types of objects of interest. The type of the object of interest may be defined by the artificial neural networks implemented by the processor 102. In the example shown, the artificial neural network implemented by the CNN module 190b may be configured to detect human faces. In the example shown, the object of interest may be a face of the person 302. The face of a person may be the object of interest when the camera system 100 is used to detect people and/or perform facial recognition. In some embodiments, the object of interest may be an animal and/or a specific type of animal (e.g., when the camera system 100 is used as a trail camera for nature video/images). In some embodiments, the object of interest may be a vehicle and/or a particular make/mode/year of a vehicle (e.g., when the camera system 100 is implemented as part of a vehicle camera system and/or a traffic camera). The types of objects of interest detected may be an option selectable by an end user. In some embodiments, types of objects of interest may be defined in the directed acyclic graph loaded by the scheduler circuit 190a. In the example shown, one object of interest is detected. In some embodiments, the processor 102 may be configured to detect more than one object of interest. The number and/or types of objects of interest detected in the video frames by the processor 102 may be varied according to the design criteria of a particular implementation.

A line 310 and a line 312 are shown. The line 310 and the line 312 may each comprise a row of pixel data of the video frame 300. The line 310 may comprise a start line location corresponding to the object 304 (e.g., the object of interest) detected. The line 312 may comprise an end line location corresponding to the object 304 (e.g., the object of interest) detected. In the example shown, the start line location 310 may generally correspond with the top of the face of the person 302 and/or the top of the bounding box 304. In the example shown, the end line location 312 may generally correspond with the bottom of the face of the person 302 and/or the bottom of the bounding box 304. The start line location 310 may correspond to an exposure time of the RGB-IR rolling shutter sensor 130. The end line location 312 may correspond to an exposure time of the RGB-IR rolling shutter sensor 130.

The processor 102 may be configured to use the start line location 310 and the end line location 312 to control the activation of the IR light projector 104. The processor 102 may be configured to dynamically control the activation of the structured light pattern SLP to align with the timing of the start line location 310 and the end line location 312. Aligning the timing of the activation of the structured light pattern SLP to the start line location 310 and the end line location 312 may ensure that the structured light pattern SLP is active when the RGB-IR rolling shutter sensor 130 is currently exposing the portion of the sensors that correspond to the location of the detected object 304.

In some embodiments, the object of interest may be a general classification of an object. For the purposes of determining the start line location 310 and the end line location 312, the computer vision operations 254 may not need to perform a fine-grained classification of the object 304. For example, when the camera system 100 is configured to perform facial recognition, the processor 102 may be configured to first detect a human face to determine the start line location 310 and the end line location 312. For the purposes of determining the start line location 310 and the end line location 312, the processor 102 may not need to identify the face detected as the face of a specific person. For example, further analysis performed using the depth analysis 252 may be performed when an image is captured with the structured light pattern SLP activated.

The processor 102 may be configured to dynamically locate (e.g., track the location of) the object of interest 304 over time. For example, the location of the object of interest 304 may change over time (e.g., the person 302 may move, walk closer to the lens 160, step away from the lens 160, etc.). The processor 102 may continually and/or continuously detect the object of interest 304 and/or determine the location of the object of interest 304. As the location of the object of interest 304 changes, the processor 102 may update the start line location 310 and the end line location 312. By updating the start line location 310 and the end line location 312 as the object of interest 304 moves (e.g., a change in position over time, a change in position over a sequence of video frames, etc.), the processor 102 may enable the activation of the structured light source 120 to be dynamically adjusted. Dynamically adjusting the activation of the structured light source 120 may ensure that the structured light pattern SLP is synchronized to the rolling shutter sensor 130 and the location of the object of interest 304.

Figure 7:
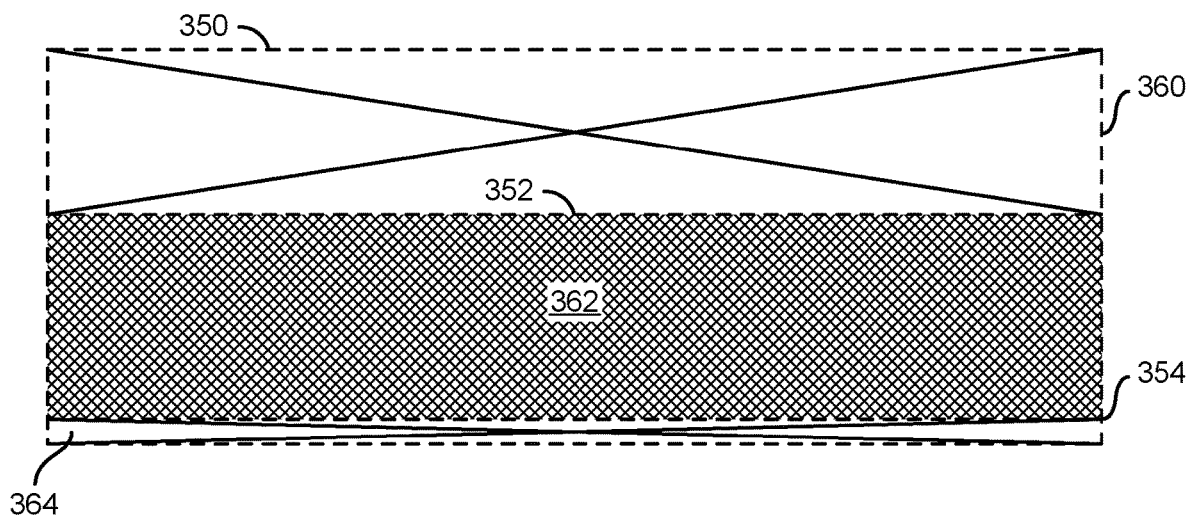
FIG. 7 is a diagram illustrating a start time and an end time for an exposure of an IR image frame.

Referring to FIG. 7, a diagram illustrating a start time and an end time for an exposure of an IR image frame is shown. An IR image frame 350 is shown. The IR image frame 350 may be a representative example of an IR frame generated by the processor 102 in response to the IR pixel data 202. The example IR image frame 350 may comprise image data generated in response to the IR data channel when the structured light pattern SLP is active. The structured light pattern SLP may be activated only for a subset of the amount of time that the RGB-IR rolling shutter uses to generate the IR pixel data 202 used to generate the IR image frame 350. In an example, the IR frame 350 may be used internally by the processor 102 for the depth sensing operations 252.

A line 352 and a line 354 are shown. The line 352 may correspond to the start line location 310 shown in association with FIG. 6. The line 354 may correspond to the end line location shown in association with FIG. 6. The start line location 352 and the end line location 354 may be used to calculate the timing of the activation and/or deactivation of the structured light projector 104.

The IR image frame 350 may comprise a portion 360, a portion 362 and a portion 364. The portion 360 may generally be a top portion of the IR image frame 350. The portion 360 may be a section of the IR image frame 350 located above the start line location 352. The portion 362 may generally comprise a middle portion of the IR image frame 350. The portion 362 may be a section of the IR image frame 350 located between the start line location 352 and the end line location 354. The portion 364 may generally be a bottom portion of the IR image frame 350. The portion 364 may be a section of the IR image frame 350 below the bottom line location 354. The location and/or size of the portion 360, the portion 362 and/or the portion 364 may depend upon the location of the start line location 352 and the end line location 354.

The portion 362 may be the region of interest location. The region of interest 362 may correspond to the location of the object of interest determined from the video frame 300 shown in association with FIG. 6. In some embodiments, if the object of interest 304 is at the top of the IR image frame 350 (e.g., the top of the bounding box 304 is the top line of the IR image frame 350), then the region of interest 362 may start at the top of the IR image frame 350 (e.g., no portion 360 may be present and only the portion 364 may be below the region of interest 362). In some embodiments, if the object of interest 304 is at the bottom of the IR image frame 350 (e.g., the bottom of the bounding box 304 is at the bottom of the IR image frame 350), then the region of interest 362 may end at the bottom of the IR image frame 350 (e.g., no portion 364 may be present an only the portion 360 may be above the region of interest 362).

The RGB-IR rolling shutter sensor 130 may be configured to capture the IR pixel data 202 by enabling the exposure row-by-row from top to bottom to capture the IR image frame 350. In the example shown, the top portion 360 may be captured first, then the region of interest 362 and then the bottom portion 364. When the RGB-IR rolling shutter sensor 130 is acquiring the IR pixel data 202 and/or the RGB pixel data 204 to generate the video frame 300 shown in association with FIG. 6, the structured light projector 104 may be off (e.g., deactivated). To generate the IR image 350, row-by-row of the RGB-IR rolling shutter sensor 130 may be exposed in sequence over time. The structured light source 120 may remain in a deactivated state while the RGB-IR rolling shutter sensor 130 captures the top portion 360.

When the RGB-IR rolling shutter sensor 130 reaches the start line location 352 (or slightly earlier depending on activation time and/or amount of integration desired), the SL control circuit 112 may generate the signal SL TRIG. The signal SL TRIG may activate the structured light source 120 (e.g., when the structured light source 120 is in a deactivated state). For example, the structured light source 120 may generate the structured light pattern SLP in response to the signal SL TRIG. Row-by-row of the RGB-IR rolling shutter sensor 130 may continue to be exposed in sequence over time. The structured light source 120 may provide the structured light pattern SLP (e.g., operate in an activated state) while the RGB-IR rolling shutter sensor captures the region of interest portion 362.

When the RGB-IR rolling shutter sensor 130 reaches the end line location 354 (or slightly later depending on deactivation time and/or the amount of integration desired), the SL control circuit 112 may generate the signal SL TRIG. The signal SL TRIG may deactivate the structured light source 120 (e.g., when the structured light source 120 is an activated state). For example, the structured light source 120 may generate the structured light pattern SLP until the signal SL TRIG is received (e.g., until the end line location 354 is reached). Row-by-row the RGB-IR rolling shutter sensor 130 may continue to be exposed in sequence over time. The RGB-IR rolling shutter sensor 130 may capture the bottom region 364 with the structured light source 120 in the deactivated state of operation. After all of the rows of the RGB-IR rolling shutter sensor 130 have been exposed, the RGB-IR rolling shutter sensor 130 may repeat the exposure process by exposing from the top row to the bottom row in sequence.

If the object of interest 304 moves, the start line location 352 and the end line location 354 for the timing of the activation and/or deactivation of the structured light pattern SLP may be dynamically adjusted. By controlling the activation/deactivation of the structured light pattern SLP according to the location of the object of interest 304 in the video frame, the structured light pattern SLP may be captured by the rolling shutter sensor 130 at a specified frame without affecting the quality of the image in other video frames.

The image signal processor 108 may be configured to generate the interrupt signal ISP SYNC and/or the signal EOF. The circuit 112 may be configured to generate the signal SL TRIG in response to the interrupt signal ISP SYNC and/or the interrupt signal EOF. The signal ISP SYNC may be configured to synchronize the timing of the structured light source 120 to the timing of the exposure of the rolling shutter sensor 130. The interrupt signal ISP SYNC and/or the interrupt signal EOF may be generated by the image signal processor 108 in response to data in the signal VIDEO generated by the rolling shutter sensor 130. In one example, the signal VIDEO may comprise the start line location 310 and the signal ISP SYNC and/or the interrupt signal EOF may provide data about the start line location 310 to the circuit 110. In another example, the signal VIDEO may comprise the end line location 312 and the signal ISP SYNC and/or the interrupt signal EOF may provide data about the start line location 312 to the circuit 110. In yet another example, the signal VIDEO may comprise other interrupts with consistent frame rate and the signal ISP SYNC and/or the interrupt signal EOF may provide data about the frame rate to the circuit 110. The circuit 110 may use the data from the interrupt signal ISP SYNC and/or the interrupt signal EOF to calculate when the rolling shutter sensor 130 may start exposure of the first line location 352. When the processor 102 determines when the rolling shutter sensor 130 may start exposure of the first line location 352, the circuit 110 may calculate the turn on time of the structured light projector 104 based on the location of the object of interest 304.

The processor 102 may be configured to perform image cropping operations on the IR image frame 350. The processor 102 may be configured to crop out the region of interest 362 from the IR image frame 350. The region of interest 362 may comprise the structured light pattern SLP captured with the desired timing and/or visual effect for performing the depth analysis 252 on the object of interest 304. The top portion 360 and the bottom portion 364 may not comprise the structured light pattern SLP captured with the desired timing and/or visual effect for performing the depth analysis 252. By cropping the region of interest 362, only visual data that has the structured light pattern SLP may be used for the depth analysis 252, while the other portions 360 and 364 that do not have the proper data may be discarded.

Figure 8:
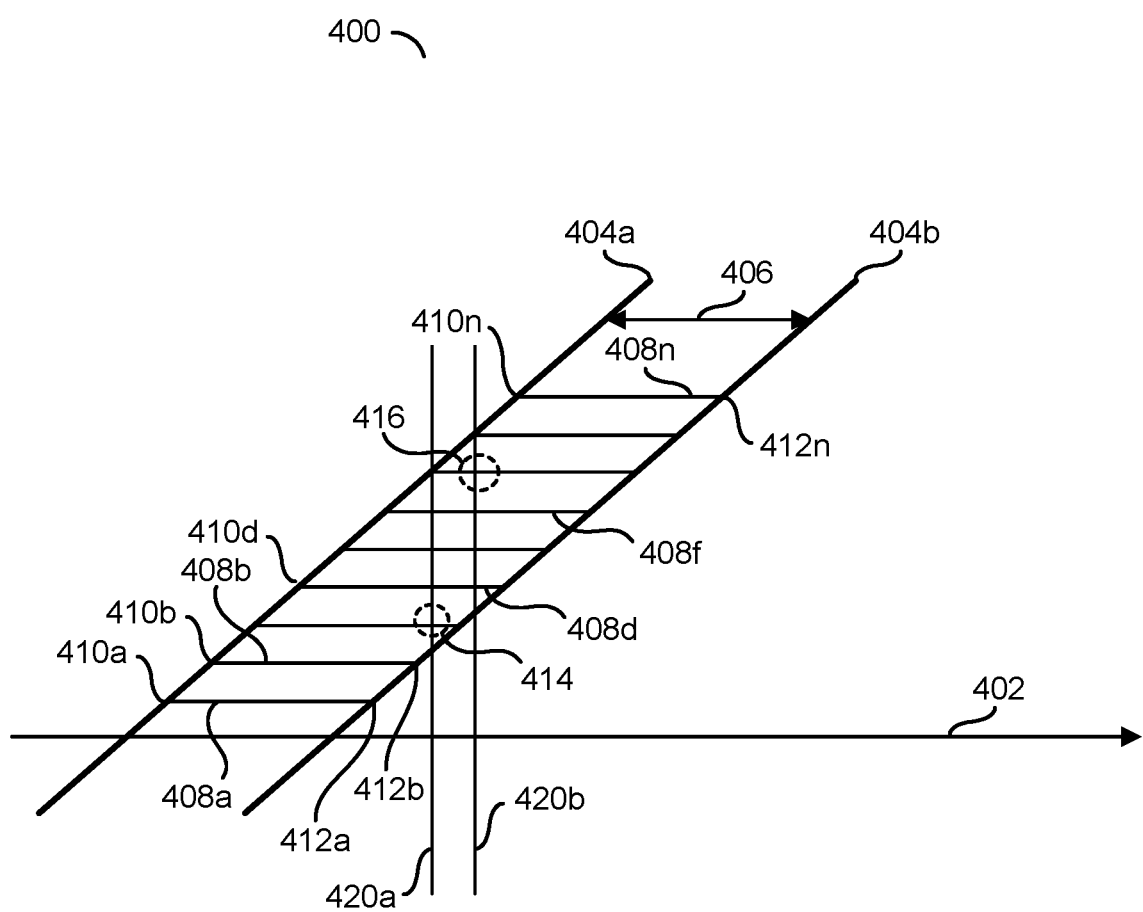
FIG. 8 is a diagram illustrating a timing diagram for a sensor exposure.

Referring to FIG. 8, a diagram illustrating a timing diagram for a sensor exposure is shown. A timing diagram 400 is shown. The timing diagram 400 may provide an illustrative example of the exposure timing of the rolling shutter sensor 130 and/or the timing of the activation of the structured light projector 104.

The timing diagram 400 may comprise a horizontal axis 402. The horizontal axis 402 may represent time. For example, the left side of the horizontal axis 402 may be a time that occurs earlier than the right side of the horizontal axis 402.

Lines 404a-404b are shown extending diagonally from the horizontal axis 402. The line 404a may generally represent a sensor/shutter exposure start time of the rolling shutter sensor 130. The line 404b may generally represent a sensor/shutter exposure end time of the rolling shutter sensor 130. A horizontal line with double-ended arrows 406 is shown between the lines 404a-404b. The horizontal arrows 406 may be an amount of time for the exposure of the rolling shutter sensor 130.

Horizontal bars 408a-408n are shown between the lines 404a-404b. Each one of the horizontal bars 408a-408n may represent the exposure of a row of pixels of the rolling shutter sensor 130. For example, the horizontal bar 408a may represent the top row of pixels of the rolling shutter sensor 130, the horizontal bar 408b may represent the second row of pixels of the rolling shutter sensor 130, and the horizontal bar 408n may represent the bottom row of pixels of the rolling shutter sensor 130. Each of row of pixels 408a-408n of the rolling shutter sensor 130 may have the same amount of exposure time 406.

Line intersections 410a-410n and line intersections 412a-412n are shown. The line intersections 410a-410n may be intersections between the line 404a and each of the horizontal bars 408a-408n. The line intersections 410a-410n may each represent a start exposure time of each of the rows of pixels 408a-408n. The line intersections 412a-412n may be intersections between the line 404b and each of the horizontal bars 408a-408n. The line intersections 412a-412n may each represent an end exposure time of each of the rows of pixels 408a-408n. In the example shown, the top line 408a may have an earlier exposure start time 410a and end time 412a than the exposure start time 410b and exposure end time 412b of the second line 408b. The exposure start times 410a-410n and the exposure end times 412a-412n may occur sequentially (e.g., the top line exposure start time 410a may occur the earliest compared to the next line exposure start times 410n-410n and the exposure end time 412a may occur the earliest, then the exposure end time 412b may occur, and finally the exposure end time 412n of the last row of pixels 408n may occur last).

Since the exposure time 406 may be the same for each of the rows of pixels 408a-408n, the temporal relationship between the start times 410a-410n and the end times 412a-412n may be the same for each of the rows of pixels 408a-408n. A next row of pixels 408a-408n may begin exposure before a previous row of pixels 408a-408n ends exposure. In the example shown, the first row of pixels may have the start time 410a earlier than the start time 410b of the second row of pixels 408b. However, the start time 410b of the second row of pixels 408b may occur earlier than the end time 412a of the first row of pixels 408a.

The staggered start times 410a-410n of the exposure of each row of pixels 408a-408n by the rolling shutter sensor 130 may result in visual artifacts (e.g., rolling shutter artifacts such as distortion of moving objects, motion blur, etc.). The video processing pipeline of the processor 102 may be configured to correct the visual artifacts caused by the rolling shutter sensor 130. The staggered start times 410a-410n may also result in the structured light pattern SLP appearing unevenly across each row of pixels 408a-408n if the activation and/or deactivation of the structured light source 120 is not synchronized to the rolling shutter sensor 130 by the processor 102.

A dotted circle 414 is shown. The dotted circle 414 may represent the start line location (e.g., the start line location 310 shown in association with FIG. 6 and/or the start line location 352 shown in association with FIG. 7) of the object of interest 304. In the example shown, the start line location 414 may be selected for the row of pixels 408c.

A dotted circle 416 is shown. The dotted circle 416 may represent the end line location (e.g., the end line location 312 shown in association with FIG. 6 and/or the end line location 354 shown in association with FIG. 7) of the object of interest 304. In the example shown, the start line location 416 may be at the row of pixels 408g. For example, the object of interest 304 may be located from the row of pixels 408d through to the row of pixels 408f.

Vertical lines 420a-420b are shown. The vertical line 420a may represent a time of the activation of the structured light source 120. The vertical line 420b may represent a time of the deactivation of the structured light source 120. The activation time 420a may align with the row of pixels 408d. The deactivation time 420b may align with the start time (e.g., 410h) of the end line location 416 of the row of pixels 408h.

For example, to select the ROI 362 comprising the lines 408d through 408f, the processor 102 may select the line 408c as first line with the structured light pattern SLP. The activation time 420a may be selected to start before the end exposure time 412c of the row of pixels 408c. Then the next line after (e.g., the row of pixels 408d) may be the first line with structured light pattern SLP with sufficient integration time. Similarly, the deactivation time 420b may be selected to turn off the structured light pattern SLP before the end of the row of pixels 408g and before the start time 410h of the row of pixels 408h. The line before the row of pixels 408g (e.g., the row of pixels 408f) may be the last line with the structured light pattern with sufficient integration time. Additional rows (e.g., two rows, three rows, etc.) of pixels before of after the ROI 362 may be selected to ensure sufficient integration time. Selecting the activation time 420a during the row of pixels 408c (e.g., a row earlier than the start of the ROI 362) and selecting the deactivation time 420b during the row of pixels 408g (e.g., a row later than the end of the ROI 362), may ensure that the all of the rows of pixels 408d-408f may have the structured light pattern SLP. The number of rows of pixels for the activation time 420a before the start line location 352 and the number of rows of pixels for the deactivation time 420b after the end line location 354 may be varied according to the design criteria of a particular implementation.

In the example shown, the activation time 420a may occur in the middle of the exposure time of some of the rows of pixels (e.g., during the exposure time of the row of pixels 408c). For example, the row of pixels 408c may not have stopped exposure yet and may receive the structured light pattern SLP. In the example shown, the activation time 420a may occur after the end exposure time 412b for the row of pixels 408b. Since the activation time 420a may occur after the end exposure time 412a and the end exposure time 412b, the rows of pixels 408a-408b may not capture the structured light pattern SLP.

Similarly, the rows of pixels after the deactivation time 420b (e.g., the last rows of pixels 408h-408n) may not capture the structured light pattern SLP. The processor 102 may be configured to crop out the image data other than the rows of pixels 408d-408f that comprise the object of interest 304. For example, the rows of pixels 408d-408f may be kept for the depth analysis 252 and the other rows of pixels 408a-408c and 408g-408n may be discarded.

The rolling shutter sensor 130 may accumulate the photons of the structured light pattern SLP (integration) during the exposure time of the row of pixels 408c. If the end time 412c of the row of pixels 408c is earlier than the deactivation time 420b of the structured light source 120, then a strength of the structured light pattern SLP for the row of pixels 408c may not be as strong as the structured light pattern SLP for the row of pixels 408d. The strength of the structured light pattern SLP may depend on the integration time. Since the exposure end time 412c is earlier than the deactivation time 420b of the structured light projector 104, the row of pixels 408c may have a shorter integration time than the row of pixels 408d. The structured light pattern SLP may start from the third line (e.g., the row of pixels 408c) until the row of pixels 408h, which starts exposure after the end line location 416.

If the processor 102 determines that the location of the object of interest 304 (e.g., the face) starts at the row of pixels 408d the structured light pattern SLP may be started at the end of the line 408c, then all the lines after the row of pixels 408c (e.g., the row of pixels 408d-408g) may receive the structured light pattern SLP and all of the lines before 408c may not receive the structured light patter SLP since the lines 408a-408b have already stopped exposure.

In some embodiments, the exposure time 406 may be reduced so that the row of pixels 408c will already stop exposure when the structured light projector 104 is turned on (e.g., ensure that the end exposure time 412c for the row of pixels 408c is earlier than the activation time 420a of the structured light projector 104). If the activation time 420a is after the end time 412c then there will be no structured light pattern shown in the row of pixels 408c.

The dotted circle 414 is shown at a cross point of the structured light pattern activation line 420a and the row of pixels 408c before the end time 412c. For example, the dotted circle 414 may represent a real start line of the structured light pattern SLP (e.g., generally equivalent to the start line location 310 shown in association with FIG. 6 or the start line location 352 shown in association with FIG. 7). Since integration time for the first several lines may be less than desired for the region of interest (e.g., the ROI 362 shown in association with FIG. 7), the start line location 352 and/or the end line location 354 may be extended to make the ROI 362 larger than the actual region with the object of interest 304. By capturing a larger region of interest with the structured light pattern SLP activated, the relevant data may be cropped and the structured light pattern SLP may be ignored for the portions where there may be lack of clarity (e.g., several lines of the beginning of the start location 352 and several lines of the end location 354). Since the integration time of the beginning and/or end lines may be less than the rest of the ROI 362, the captured image may be too dark. For example, the upper and lower border of the ROI 362 may not be very clear (e.g., dark-normal-dark).

Controlling the timing of the activation of the structured light projector 104 may provide power savings. The structured light pattern SLP may be turned off when the object of interest 304 is not present. By limiting the activation of the structured light projector 104 to a range of time of exposure of the rows of pixels 408a-408n where the object of interest 304 is actually located, the structured light projector 104 may not be activated at all times. Turning off the structured light projector 104 may reduce power consumption. Since the structured light pattern SLP may not be needed for the depth analysis 252 outside of the ROI 362, the structured light projector 104 may be deactivated without negatively impacting capabilities of the depth analysis 252.

Figure 9:
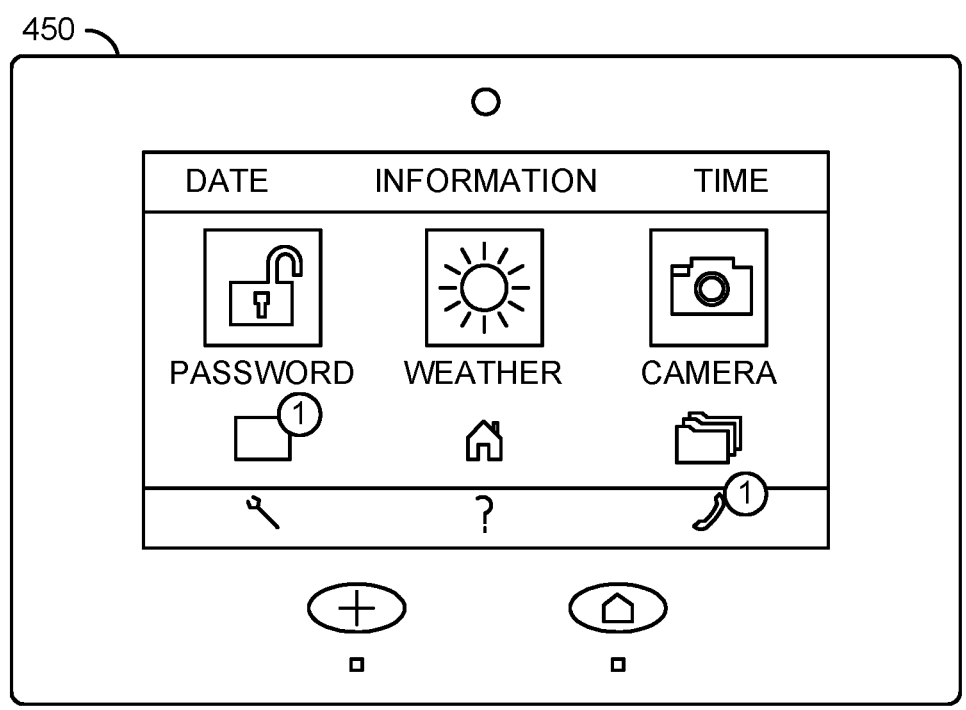
FIG. 9 is a diagram illustrating an example security panel providing a facial disarm feature.

Referring to FIG. 9, a diagram illustrating an example security panel providing a facial disarm feature is shown. In an example, a low cost 3D sensing system in accordance with an example embodiment of the invention may be implemented as part of a security panel 450. In an example, the security control panel 450 may be configured to limit access and/or permissions based on facial recognition. In an example, the 3D information determined using the depth analysis 252 may be used for 3D modeling and liveness determination and may be used to recognize particular users facially and automatically provide hands-free access (e.g., unlocking a door, disarming an alarm system, etc.). In an example, the 3D modeling and liveness determination of the depth analysis 252 may be used to recognize particular users and allow alarm system re-programming privileges based on facial identification (e.g., only person X or Y may be permitted to change access level or policy, add users, etc. even if the correct password is entered).

Figure 10:
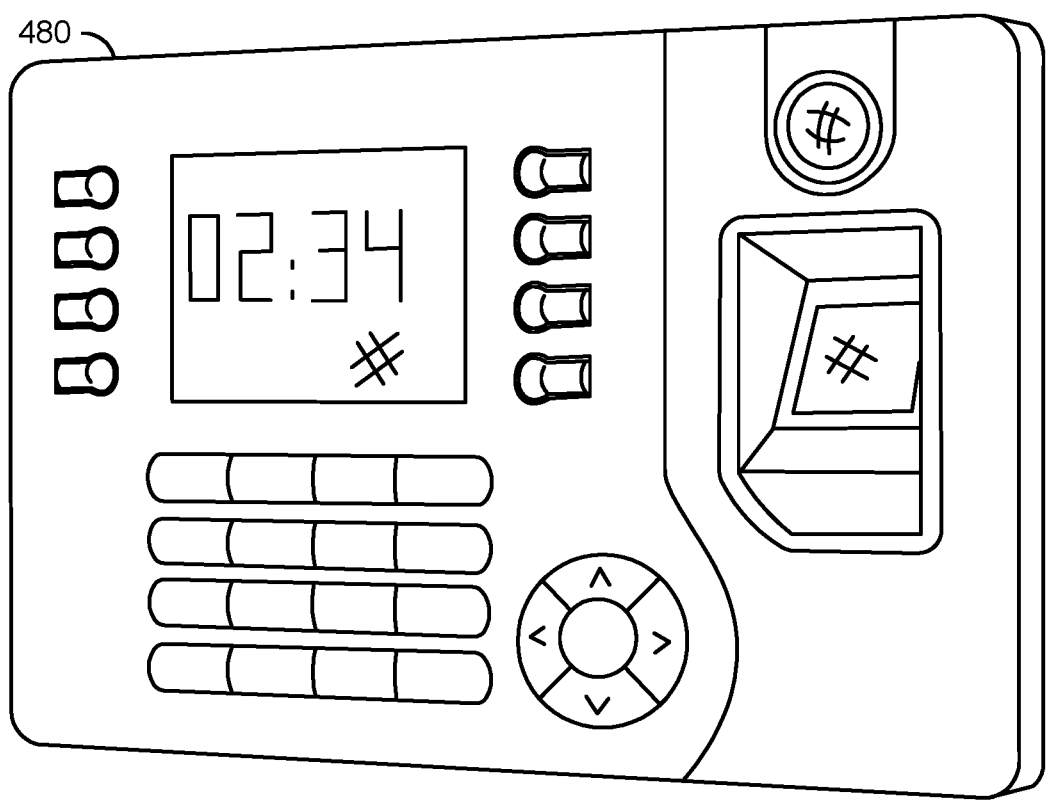
FIG. 10 is a diagram illustrating an example access control panel.

Referring to FIG. 10, a diagram illustrating an example access control panel is shown. In various embodiments, a low cost structured light based 3D sensing system comprising the apparatus 100 may be implemented as part of an access control panel 480. In an example, the 3D information generated by capturing the structured light pattern SLP using the dynamic driver mechanism for the rolling shutter sensor 130 may be used for 3D modeling and liveness determination. In an example, the low cost structured light based 3D sensing system may be used to gain access to a payment system (e.g., ATM, etc.), disarm an alarm system, and/or allow "tripwire" access to a restricted region (e.g., of a garden, a garage, a house, etc.). In one example, the low cost structured light based 3D sensing system may be configured to recognize a gardener/pool maintenance person and inhibit triggering an alarm. In another example, the low cost structured light based 3D sensing system may be configured to limit access to certain times and days of the week. In another example, the low cost structured light based 3D sensing system may be configured to allow alarm system re-programming privilege through the access control panel 480 based on video/audio identification (e.g., only person X or Y may be permitted to change access level or policy, add users, etc. even if the correct password is entered).

Figure 11:
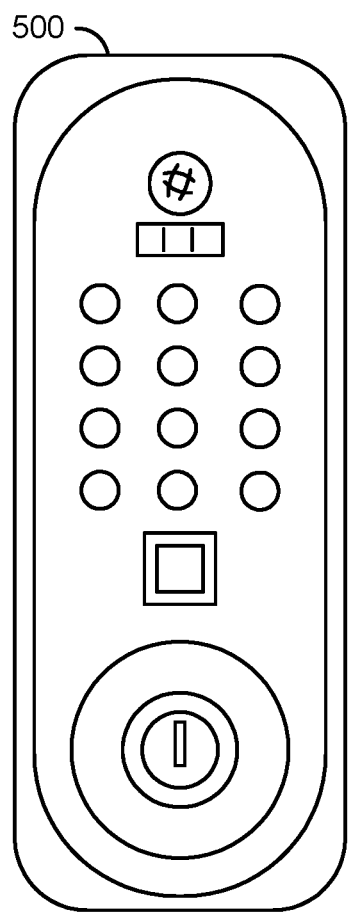
FIG. 11 is a diagram illustrating an example access control panel using a password.

Referring to FIG. 11, a diagram illustrating an example access control panel using a password is shown. In various embodiments, a low cost structured light based 3D sensing system comprising the apparatus 100 may be implemented as part of a security keypad 500. In an example, the security keypad 500 may be configured to limit access and/or permissions based on facial recognition determined by using the depth analysis 252. In an example, the 3D information from the depth analysis 252 may be used for 3D modeling and liveness determination and may be used to recognize particular users and allow access, alarm system disarm privileges, alarm system programming privileges, and/or alarm system re-programming privileges based on facial identification. In an example, only a known person (e.g., person X or Y) may be permitted to gain access or change access level or policy, add users, etc. even if the correct password is entered on the keypad 500.

Figure 12:
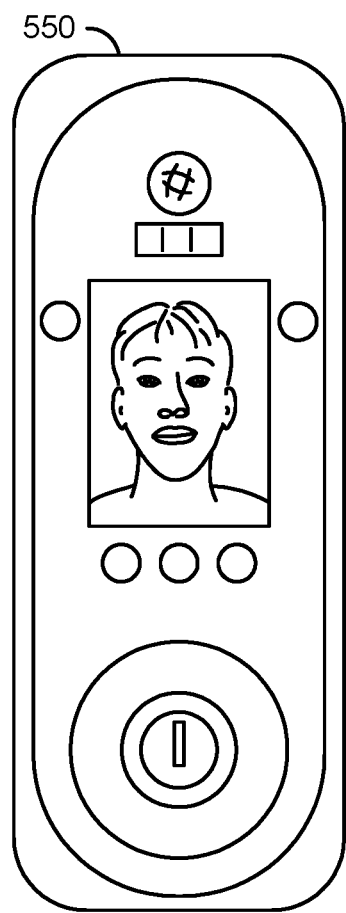
FIG. 12 is a diagram illustrating an example access control panel using facial recognition.

Referring to FIG. 12, a diagram illustrating an example access control panel using facial recognition is shown. An alternate example access control panel 550 that may utilize the apparatus 100 for facial recognition is shown. The facial recognition may be performed using the computer vision operations 254 in combination with the depth analysis 252.

Figure 13:
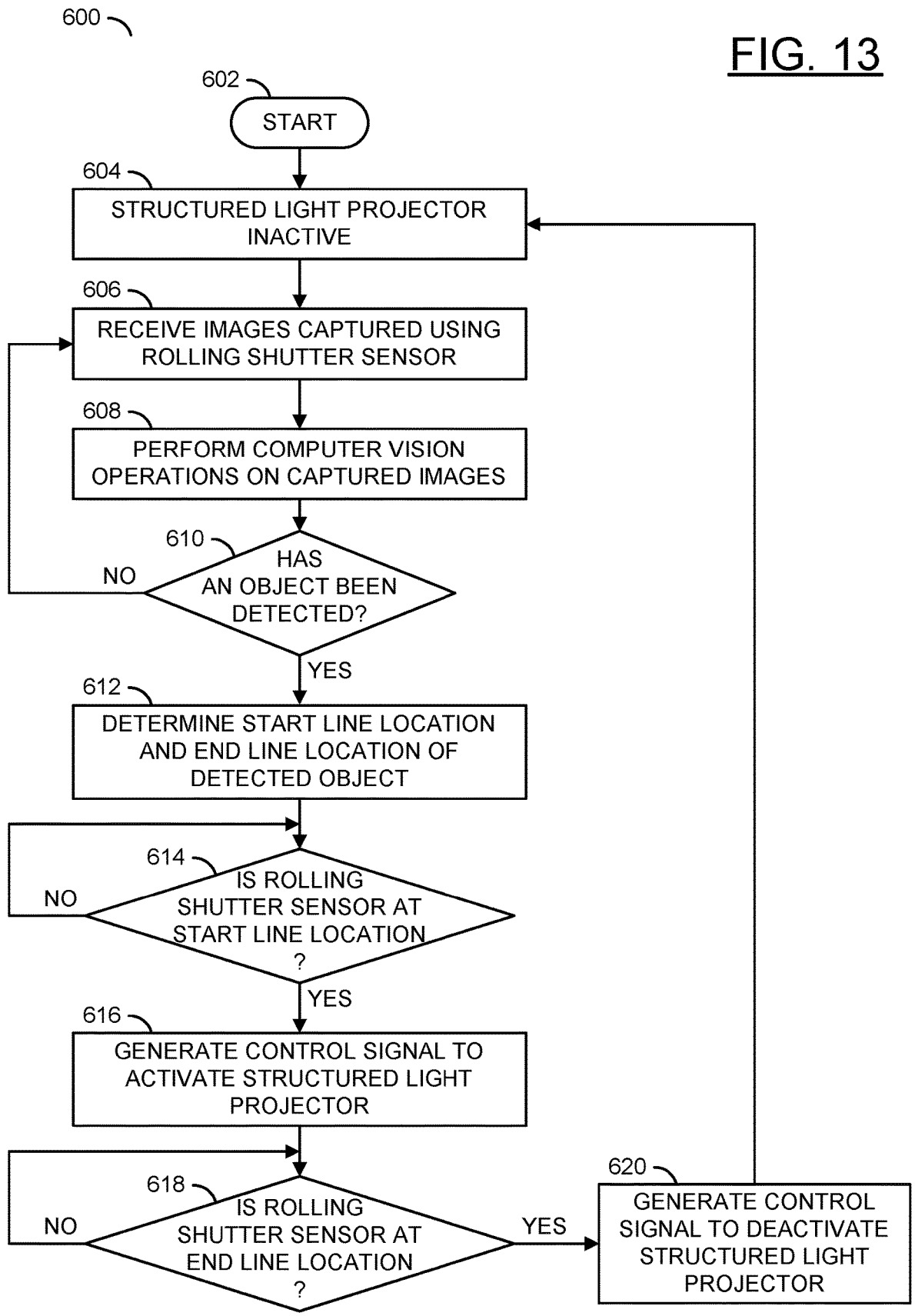
FIG. 13 is a flow diagram illustrating a method for acquiring a structured light pattern using a rolling shutter sensor.

Referring to FIG. 13, a method (or process) 600 is shown. The method 600 may acquire a structured light pattern using a rolling shutter sensor. The method 600 generally comprises a step (or state) 602, a step (or state) 604, a step (or state) 606, a step (or state) 608, a decision step (or state) 610, a step (or state) 612, a decision step (or state) 614, a step (or state) 616, a decision step (or state) 618, and a step (or state) 620.

The step 602 may start the method 600. In the step 604, the structured light projector 104 may be inactive (e.g., the SL control circuit 112 may not present the signal SL TRIG). Next, in the step 606, the processor 102 may receive images (e.g., the signal VIDEO) captured using the rolling shutter sensor 130. In the step 608, the processor 102 may perform the computer vision operations 254 on the captured images. Next, the method 600 may move to the decision step 610.

In the decision step 610, the processor 102 may determine whether the object 304 has been detected. In an example, the CNN module 190b may determine whether a human face is present in the video frames. If an object of interest has not been detected, then the method 600 may return to the step 606. If the object of interest 304 has been detected, then the method 600 may move to the step 612. In the step 612, the processor 102 may determine the start line location 310 and the end line location 312 of the object of interest 304 in the video frame 300. The start line 310 and the end line 312 may correspond to a row of pixels output by the rolling shutter sensor 130. Next, the method 600 may move to the decision step 614.

In the decision step 614, the processor 102 may determine whether the rolling shutter sensor 130 has reached the start line location 310. For example, the image signal processor 108 may present one or more signals that indicate a line location of the rolling shutter sensor 130 (e.g., the end of frame signal EOF) in response to the signal VIDEO. Timing information about the rate of exposure of the lines of the rolling shutter sensor 130 may be used to determine the amount of time to reach the start line location 310 based on the end of frame signal EOF. For example, the end of frame signal EOF may be an interrupt signal generated by the image signal processor 108. The processor 102 may implement a timer based on a system clock (e.g., implemented by the processor 102). The timer may be configured to provide the turn on time for the structured light projector 104. If the rolling shutter sensor 130 is not at the start line location 310, then the method 600 may return to the decision step 614. If the rolling shutter sensor 130 is at the start line location 310, then the method 600 may move to the step 616. In the step 616, the SL control circuit 112 may generate the control signal SL TRIG to activate the structured light projector 104. Next, the method 600 may move to the decision step 618.

Figure 14:
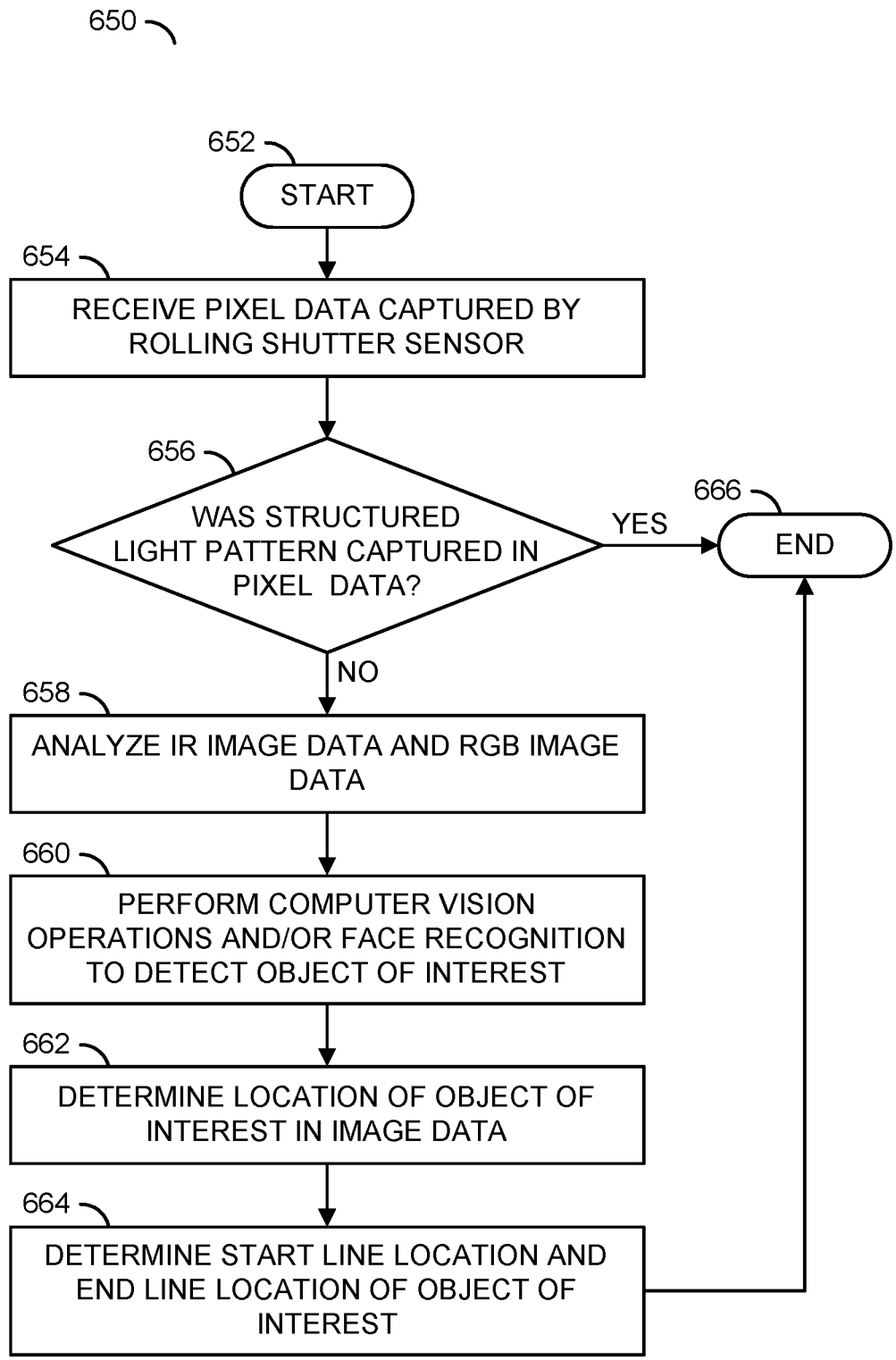
FIG. 14 is a flow diagram illustrating a method for performing computer vision to detect an object to determine a start and end line of a region of interest in a video frame when a structured light pattern is not active.

In the decision step 618, the processor 102 may determine whether the rolling shutter sensor 130 has reached the end line location 312. For example, the image signal processor 108 may present one or more signals that indicate a line location of the rolling shutter sensor 130 and/or the processor 102 may be configured to perform calculations based on exposure times for each line of the rolling shutter sensor (e.g., determine an amount of time from the start line location 310 until the rolling shutter sensor reaches the end line location 312). The processor 102 may implement a timer based on a system clock (e.g., implemented by the processor 102). The timer may be configured to provide the turn off time for the structured light projector 104. If the rolling shutter sensor 130 is not at the end line location 312, then the method 600 may return to the decision step 618. If the rolling shutter sensor 130 is at the end line location 312, then the method 600 may move to the step 620. In the step 620, the SL control circuit 112 may generate the control signal SL TRIG to deactivate the structured light projector 104. In some embodiments, the processor 102 may activate the structured light projector 104 earlier than the start line location 310 and/or deactivate the structured light projector 104 later than the end line location 312 to ensure that the region of interest 362 has a sufficient integration time. Next, the method 600 may return to the step 604. Referring to FIG. 14, a method (or process) 650 is shown.

The method 650 may perform computer vision to detect an object to determine a start and end line of a region of interest in a video frame when a structured light pattern is not active. The method 650 generally comprises a step (or state) 652, a step (or state) 654, a decision step (or state) 656, a step (or state) 658, a step (or state) 660, a step (or state) 662, a step (or state) 664, and a step (or state) 666.

The step 652 may start the method 650. In the step 654, the processor 102 may receive the pixel data captured by the rolling shutter sensor 130. Next, the method 650 may move to the decision step 656.

In the decision step 656, the processor 102 may determine whether the structured light pattern was captured in the pixel data. For example, the processor 102 may determine whether the structured light pattern SLP was captured based on the activation state of the structured light projector 104 and/or the state of the signal SL TRIG. If the structured light pattern SLP was captured, then the method 650 may move to the step 666. If the structured light pattern SLP was not captured, then the method 650 may move to the step 658.

In the step 658, the processor 102 may analyze the IR image data 202 and/or the RGB image data 204. Next, in the step 660 the CNN module 190b may perform the computer vision operations 254 and/or face recognition in order to detect the object of interest 304. In the step 662, the processor 102 may determine the location of the object of interest 304 in the image data. Next, the method 650 may move to the step 664.

In the step 664, the processor 102 may determine the start line location 310 and the end line location 312 of the object of interest 304. The processor 102 may use the start line location 310 and the end line location 312 to determine the region of interest 362 for when the structured light pattern SLP is active. Next, the method 650 may move to the step 666. The step 666 may end the method 650.

Figure 15:
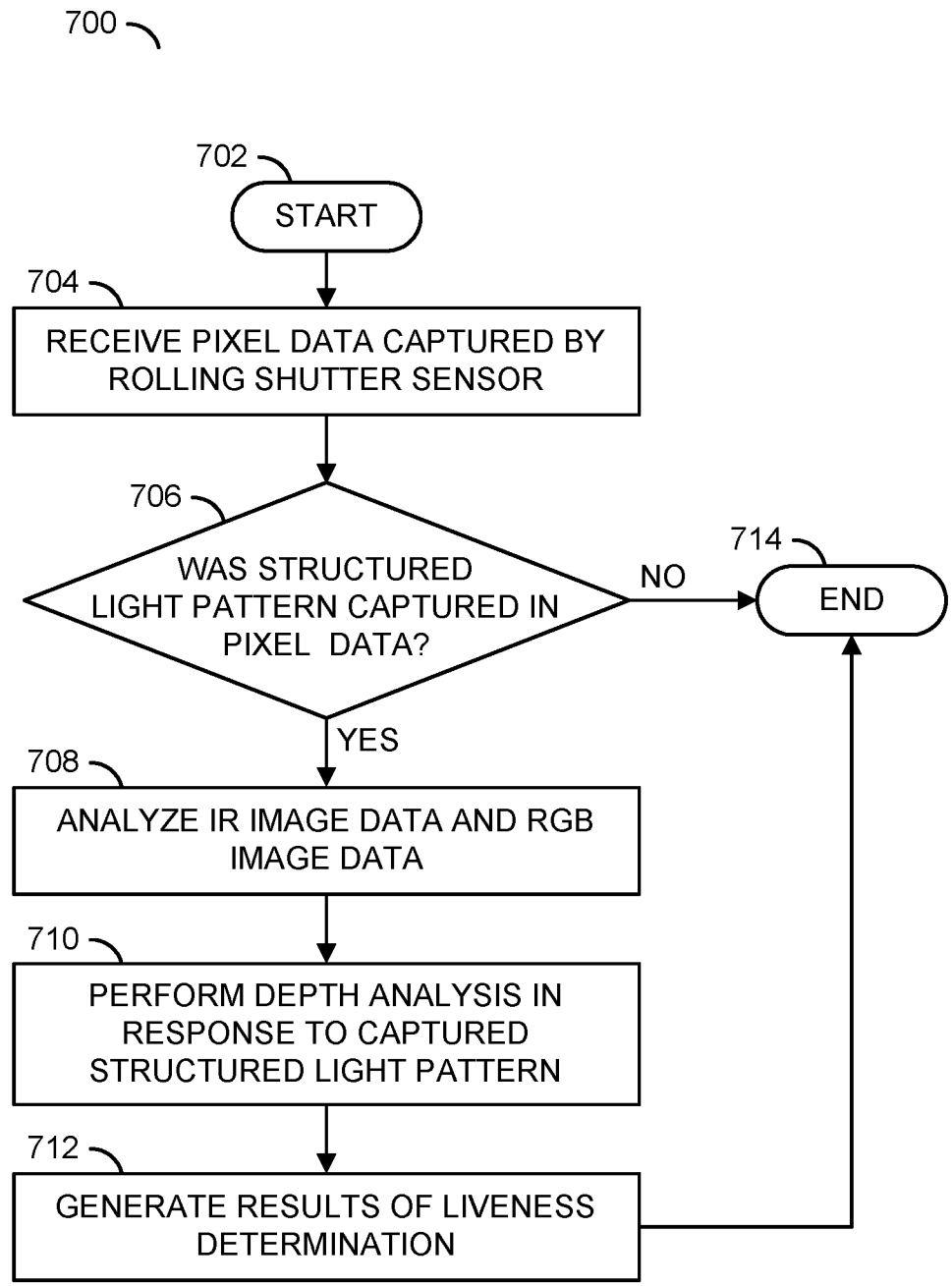
FIG. 15 is a flow diagram illustrating a method for performing a depth analysis when a structured light pattern is active.

Referring to FIG. 15, a method (or process) 700 is shown. The method 700 may perform a depth analysis when a structured light pattern is active. The method 700 generally comprises a step (or state) 702, a step (or state) 704, a decision step (or state) 706, a step (or state) 708, a step (or state) 710, a step (or state) 712, and a step (or state) 714.

The step 702 may start the method 700. In the step 704, the processor 102 may receive the pixel data captured by the rolling shutter sensor 130. Next, the method 700 may move to the decision step 706.

In the decision step 706, the processor 102 may determine whether the structured light pattern SLP was captured in the pixel data. For example, the processor 102 may determine whether the structured light pattern SLP was captured based on the activation state of the structured light projector 104 and/or the state of the signal SL TRIG. If the structured light pattern SLP was not captured, then the method 700 may move to the step 714. If the structured light pattern SLP was captured, then the method 700 may move to the step 708.

In the step 708, the processor 102 may analyze the IR image data 202 and/or the RGB image data 204. With the structured light pattern SLP activated, the processor 102 may receive the IR image data 202 and/or the RGB data 204 along with the structured light pattern SLP. Generally, when the structured light pattern SLP is present, the RGB data 204 may be ignored. Next, in the step 710, the CNN module 190b may perform the depth analysis 252 in response to the structured light pattern SLP and the IR image data 202. In the step 712, the processor 102 may generate the results 256 of the liveness determination. Next, the method 700 may move to the step 714. The step 714 may end the method 700.

Figure 16:
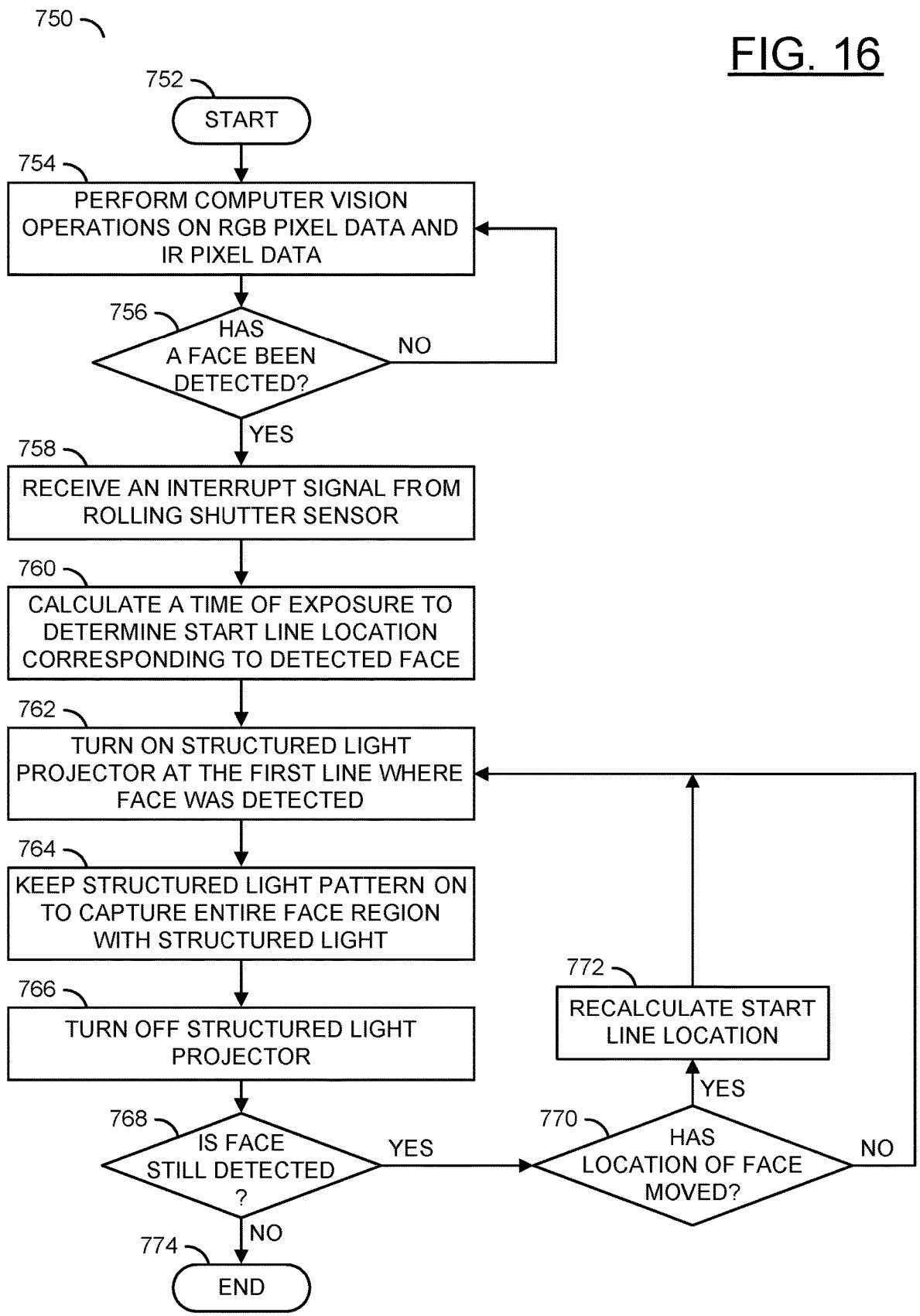
FIG. 16 is a flow diagram illustrating a method for implementing a dynamic driver mechanism for a rolling shutter sensor.

Referring to FIG. 16, a method (or process) 750 is shown. The method 750 may implement a dynamic driver mechanism for a rolling shutter sensor. The method 750 generally comprises a step (or state) 752, a step (or state) 754, a decision step (or state) 756, a step (or state) 758, a step (or state) 760, a step (or state) 762, a step (or state) 764, a step (or state) 766, a decision step (or state) 768, a decision step (or state) 770, a step (or state) 772, and a step (or state) 774.

The step 752 may start the method 750. In the step 754, the processor 102 may perform the computer vision operations 254 on the RGB pixel data 204 and/or the IR image pixel data 202. Next, the method 750 may move to the decision step 756.

In the decision step 756, the processor 102 may determine whether a face (e.g., the object of interest 304) has been detected. If the face has not been detected, then the method 750 may return to the step 754. If the face has been detected, then the method 750 may move to the step 758. In the step 758, the processor 102 may receive an interrupt signal (e.g., the end of frame signal EOF) from the image signal processor 108. Next, the method 750 may move to the step 760.

In the step 760, the processor 102 may calculate the time of exposure 406 to determine the start line time 310 corresponding to the detected face 304. Next, in the step 762, the processor 102 may generate the signal SL TRIG to turn on the structured light projector 104 at the first line 310 where the face 304 was detected. In the step 764, the processor 102 may keep the structured light pattern SLP activated to capture the entire face region of interest 362. Next, in the step 766, the processor 102 may turn off the structured light projector 104 (e.g., when the end line 312 has been reached). Next, the method 750 may move to the decision step 768.

In the decision step 768, the processor 102 may determine whether the face 304 is still detected. For example, the RGB image data 204 and/or the IR image data 202 may be analyzed using the computer vision operations 254 to detect the location of the face 304. If the face 304 has been detected, then the method 768 may move to the decision step 770. In the decision step 770, the processor 102 may determine whether the location of the face 304 has moved (e.g., whether the face is at a different location in the captured video frames). If the location of the detected face 304 has not moved, then the method 750 may return to the step 762. If the location of the detected face 304 has moved, then the method 750 may move to the step 772. In the step 772, the processor 102 may recalculate the start line location 310. Next, the method 750 may return to the step 762.

In the decision step 768, if the face 304 is no longer detected, then the method 750 may move to the step 774. The step 774 may end the method 750.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a rolling shutter image sensor configured to capture images;
   a structured light projector configured to generate a structured light pattern; and
   a processor configured to (i) receive said images from said rolling shutter image sensor, (ii) perform computer vision operations on said images to detect an object in said images, (iii) determine a start line location and an end line location corresponding to said object detected and (iv) present a control signal to said structured light projector, wherein said control signal is configured to (a) activate said structured light pattern when said rolling shutter image sensor is at said start line location and (b) deactivate said structured light pattern when said rolling shutter image sensor is at said end line location.

2. The apparatus according to claim 1, wherein said control signal is configured to enable said rolling shutter image sensor to capture said structured light pattern at a specific area corresponding to said object detected.

3. The apparatus according to claim 1, wherein said processor is further configured to use said structured light pattern to generate a depth image.

4. The apparatus according to claim 3, wherein said depth image is analyzed by said processor to perform at least one of 3D sensing, 3D modeling, 3D face recognition and liveness judgment.

5. The apparatus according to claim 1, wherein said object detected is a human face.

6. The apparatus according to claim 1, wherein a portion of said images between said start line location and said end line location is a region of interest.

7. The apparatus according to claim 6, wherein said region of interest is dynamically adjusted in response to a change in position of said object detected over time.

8. The apparatus according to claim 1, wherein said rolling shutter image sensor comprises an RGB-IR sensor.

9. The apparatus according to claim 1, wherein (i) said processor further comprises an image signal processing circuit, (ii) said image signal processing circuit is configured to (a) generate an interrupt signal in response to said images received from said rolling shutter image sensor, (iii) in response to said interrupt signal, said processor is further configured to (a) calculate a time of an exposure to determine said start line location and (b) implement a timer based on a system clock and (iv) said timer is configured to provide a turn on time of said structured light projector after said object is detected.

10. The apparatus according to claim 9, wherein said interrupt signal comprises an indication of said start line location.

11. The apparatus according to claim 10, wherein activating said structured light pattern when said rolling shutter image sensor is at said start line location and deactivating said structured light pattern when said rolling shutter image sensor is at said end line location reduces a power consumption compared to implementing a global shutter image sensor.

12. The apparatus according to claim 9, wherein said interrupt signal comprises an indication of said end line location.

13. The apparatus according to claim 9, wherein said interrupt signal comprises data corresponding to a consistent frame rate to enable said processor to calculate said time of said exposure to determine said start line location.

14. The apparatus according to claim 9, wherein said interrupt signal and said timer are implemented to control a timing of an activation of said structured light pattern to match an exposure timing of said images.

15. The apparatus according to claim 1, wherein said apparatus is implemented as part of a low power camera.

16. The apparatus according to claim 1, further comprising a second rolling shutter sensor, wherein (a) said rolling shutter sensor comprises an RGB rolling shutter sensor and (b) said second rolling shutter sensor comprises an IR rolling shutter sensor configured to capture IR images.

17. The apparatus according to claim 1, further comprising an image signal processing circuit configured to process said images captured by said rolling shutter image sensor, wherein said image signal processing circuit splits said images into color image data and infrared (IR) image data.

18. The apparatus according to claim 17, wherein said processor is further configured to (i) analyze said IR image data when said structured light pattern is activated to obtain 3D information for a field of view of said rolling shutter image sensor and (ii) analyze said IR image data and said color image data when said structured light pattern is deactivated to perform said computer vision operations to determine said start line location and said end line location of said object detected.

19. The apparatus according to claim 1, wherein said processor is further configured to crop portions of said images above said start line location and below said end line location when said structured light pattern is activated.

20. A method for acquiring a structured light pattern using a rolling shutter sensor, comprising the steps of:
    (A) capturing images using said rolling shutter sensor;
    (B) receiving said images at a processor;
    (C) performing computer vision operations on said images to detect an object in said images;
    (D) determining a start line location and an end line location corresponding to said object detected;
    (E) presenting a control signal to a structured light projector; and
    (F) generating said structured light pattern using said structured light projector, wherein said control signal is configured to (a) activate said structured light pattern when said rolling shutter image sensor is at said start line location and (b) deactivate said structured light pattern when said rolling shutter image sensor is at said end line location.

* * * * *